(12) United States Patent
Mitsushio et al.

(10) Patent No.: US 8,538,076 B2
(45) Date of Patent: Sep. 17, 2013

(54) IMAGE PROCESSING DEVICE AND IMAGE PROCESSING PROGRAM

(75) Inventors: Takashi Mitsushio, Ayabe (JP); Takeshi Yoshiura, Ayabe (JP); Koji Shimada, Ayabe (JP)

(73) Assignee: OMRON Corporation, Kyoto-shi (JP)

( * ) Notice: Subject to any disclaimer, the term of this patent is extended or adjusted under 35 U.S.C. 154(b) by 274 days.

(21) Appl. No.: 13/029,480

(22) Filed: Feb. 17, 2011

(65) Prior Publication Data

US 2011/0222725 A1 Sep. 15, 2011

(30) Foreign Application Priority Data

Mar. 12, 2010 (JP) ................................. 2010-056553
Jun. 28, 2010 (JP) ................................. 2010-146544

(51) Int. Cl.
*G06K 9/00* (2006.01)

(52) U.S. Cl.
USPC ............................ 382/103; 382/141; 382/197

(58) Field of Classification Search
USPC ................. 382/141, 149, 168, 209, 294, 103, 382/197; 345/175, 87, 104, 125, 173
See application file for complete search history.

(56) References Cited

U.S. PATENT DOCUMENTS 8,243,986 B2 * 8/2012 Silver et al. ................... 382/103

FOREIGN PATENT DOCUMENTS

JP 2004-253983 A 9/2004

* cited by examiner

*Primary Examiner* — Ruiping Li
(74) *Attorney, Agent, or Firm* — Marvin A. Motsenbocker; Mots Law, PLLC

(57) ABSTRACT

An image processing device receives a captured image as input from an image capturing device installed in a conveying mechanism that conveys and tests works. The image processing device causes the image capturing device to capture images a plurality of times at a predetermined time interval. Based on the position of the work detected from the captured image output from the image capturing device by capturing the images at a predetermined time interval and the target position set by the user's operation, the image processing device derives the delay time required for capturing the image at the timing when the work is positioned near the target position, and sets the derived delay time for the image capturing timing of the image capturing device.

7 Claims, 18 Drawing Sheets

IMAGE WHEN TRIGGER IS INPUTTED

TRIGGER INPUT + FIRST IMAGE

IMAGE PROCESSING DEVICE AND IMAGE PROCESSING PROGRAM

CROSS REFERENCE TO RELATED APPLICATIONS

This application claims priority based on 35 USC 119 from prior Japanese Patent Application No. 2010-056553 filed on Mar, 12, 2010, and Japanese Patent Application No. 2010-146544 filed on Jun. 28, 2010, entitled "IMAGING PROCESSING DEVICE AND IMAGE PROCESSING PROGRAM" and the entire contents of which are incorporated herein by reference.

BACKGROUND OF THE INVENTION

1. Technical Field

The present invention relates to an image processing device and an image processing program for processing a captured image of a test target and, more particularly, relates to an image processing device and an image processing program for controlling imaging timings.

2. Related Art

In order to test works (test targets) conveyed on a manufacturing line, a timing of a trigger signal needs to be adjusted to capture an image within a test range of an image sensor. That is, a trigger signal is input to an image sensor using an external general-use sensor as a trigger sensor, and the image sensor captures an image according to the trigger signal.

With this testing system, the entire image of a test target object needs to be generated to perform a reliable test. However, generally, prior to starting test, the relationship between positions to install a trigger sensor and image sensor is adjusted to generate image data in a state where a test target object is positioned in the center.

However, this type of adjustment is performed by actually moving the manufacturing line and testing system and checking an obtained image through a monitor, and therefore takes time due to repetition of trial and error. Further, when the sensor and monitor are spaced apart, two people are required for the operation. Furthermore, depending on the type of test target object and the purpose of test, the positions of sensors must be re-adjusted when the moving speed of the manufacturing line is changed.

To alleviate these problems, the applicant proposed the image processing device disclosed in Japanese Unexamined Patent Publication No. 2004-253983. This image processing device outputs a trigger signal to an imaging device according to a detection signal input from the sensors being oriented toward a predetermined position of the manufacturing line of the moving path. Further, the amount of delay to control an output timing of the trigger signal is set. According to Japanese Unexamined Patent Publication No. 2004-253983, the user checks the position of a target object on a screen and performs an operation of moving the target object to the center of the screen to adjust the value of the amount of delay. More specifically, by operating a right-pointing arrow key when the target object is positioned to the left on the screen, and operating a left-pointing arrow key when the target object is positioned to the right, the amount of delay is increased by a predetermined amount or decreases by a predetermined amount.

The method disclosed in Japanese Unexamined Patent Publication No. 2004-253983 needs to repeat the operation of inputting an amount of delay by assumption, then actually moving the manufacturing line, capturing an image using the amount of delay and visually checking the image, and therefore labor and time has been required to decide the amount of delay.

SUMMARY

In accordance with one aspect of the invention, there is provided an image processing device, which drives an imaging device toward a conveying path of a target object and which processes a captured image acquired from the imaging device for observation of the target object, the image processing device including: a detection signal input unit that receives a detection signal as input from a sensor being oriented toward a predetermined position of the conveying path; a command output unit that outputs an imaging command to the imaging device according to the input of the detection signal; and a delay amount setting unit that sets the amount of delay for controlling an output timing of the imaging command, in the command output unit, wherein the delay amount setting unit includes: an input unit that receives an operation from outside; an output unit that outputs at least a captured image and operation contents received by the input unit; a target position acquiring unit that acquires the target position in the captured image from the operation contents received by the input unit; a position detecting unit that detects the position of the target object in the captured image acquired when the detection signal input unit receives the detection signal as input; and an imaging controlling unit that commands the imaging device to capture images a plurality of times at a predetermined time interval; and the delay amount setting unit derives an amount of delay required to capture an image at a timing when the target object is positioned near the target position based on the relationship between the target position and the position of the target object detected by the position detecting unit from the captured image captured at a predetermined time interval and output from the imaging device, and determines the derived amount of delay as the amount of delay set in the command output unit.

Preferably, the target position acquiring unit includes a selecting unit that selects the captured image specified by the operation contents received by the input unit, from a plurality of captured images acquired by capturing images a plurality of times at a predetermined time interval, and detects the position of the target object from the selected captured image as the target position.

Preferably, the delay amount setting unit detects the order of each of the plurality of captured images, and derives the amount of delay from the value of the order detected for the selected captured image and the predetermined time.

Preferably, the output unit switches and displays the plurality of captured images.

Preferably, the output unit displays a list of the plurality of captured images.

Preferably, the target position acquiring unit includes a selecting unit that selects the captured image specified by the operation contents received by the input unit, from a plurality of captured images acquired by capturing images a plurality of times at a predetermined time interval, and detects the target position from the amount of operation received by the input unit for moving the position of the target object in the selected captured image.

Preferably, the target position acquiring unit includes a selecting unit that selects the captured image specified by the operation contents received by the input unit, from a plurality of captured images acquired by capturing images a plurality of times at a predetermined time interval, and the delay amount setting unit derives the amount of delay using the distance between the position of the target object in the selected captured image and the position of the target object detected by the position detecting unit.

Preferably, the target position acquiring unit includes: a first unit that detects a vector oriented from one target object in the captured image to the other target object for a pair of two captured images continuously acquired among the plurality of captured images acquired by capturing images a plurality of times at a predetermined interval; and a second unit that detects a vector that uses one target object in the captured image as the start point and uses the end point as the target position, from operation contents received by the input unit, and the delay amount setting unit derives the amount of delay using the unit that detects the distance between the position of one target object and the position of the other target object in the captured image, the detected distance, the vector detected by the first unit and the vector detected by the second unit.

In accordance with another aspect of the invention, there is provided an image processing device that drives an imaging device being oriented toward a conveying path of a target object and processes a captured image acquired from the imaging device to execute observation processing of the target object, the image processing device including: a detection signal input unit that receives a detection signal as input from a sensor being oriented toward a predetermined position of the conveying path; a command output unit that outputs an imaging command to the imaging device; an operation input unit that receives an operation from outside; an image output unit that outputs an image to be displayed on a display device; and a delay amount setting unit that sets an amount of delay produced between a time when the detection signal input unit receives the detection signal as input and a time when the command output unit outputs the imaging command.

The above delay amount setting unit causes the command output unit to output the imaging command a plurality of times at a time interval set in advance after the detection signal input unit receives the detection signal as input; causes the image output unit to output at least one of a plurality of captured images obtained according to the plurality of imaging commands; and derives the amount of delay for the subsequent observing process based on the time when the imaging command matching the captured image is output and operation contents are received by the operation input unit.

Preferably, the operation input unit includes a selection operation input unit that receives an operation of selecting the at least one captured image of the plurality of captured images, and the delay amount setting unit stores in association each of the plurality of captured images and a time produced between the time when the detection signal input unit receives the detection signal as input and the time when the imaging command matching the captured image is output; and selects the time associated with the at least one captured image to be output as the amount of delay by the selecting operation received by the selecting operation input unit.

Preferably, the operation input unit includes an increasing/decreasing operation input unit that receives an operation of increasing or decreasing the time associated with the at least one captured image, and the delay amount setting unit increases or decreases the selected time according to an amount of increase/decrease specified by the operation received by the increasing/decreasing input unit.

Preferably, the delay amount setting unit causes the image output unit switch and output the plurality of captured images.

Preferably, the delay amount setting unit causes the image output unit display a list of the plurality of captured images.

Preferably, the operation input unit includes a sliding operation input unit that receives a sliding operation of the displayed captured image from outside, and, in a state where one of the plurality of captured images is output, the delay amount setting unit calculates the amount of delay from the amount of displacement resulting from the sliding operation received by the sliding operation input unit and a conversion formula matching the moving speed of the target object.

Preferably, the operation input unit includes an increasing/decreasing operation input unit that receives an operation of increasing or decreasing the calculated amount of delay, and the delay amount setting unit increases or decreases the calculated amount of delay according to the amount of increase/decrease specified by the operation received by the increasing/decreasing operation input unit.

In accordance with still another aspect of the invention, there is provided an image processing program to be executed by the image processing device that drives an imaging device being oriented toward a conveying path of a target object and processes a captured image acquired from the imaging device to execute observation processing of the target object. The image processing device includes: a detection signal input unit that receives a detection signal as input from a sensor being oriented toward a predetermined position of the conveying path; a command output unit that outputs an imaging command to the imaging device; an operation input unit that receives an operation from outside; and an image output unit that outputs an image to be displayed on a display device.

The image processing program causes the image processing device to execute a step of setting an amount of delay produced between the time when the detection signal input unit receives the detection signal as input and a time when the command output unit outputs the imaging command. The step of setting the amount of delay includes: a step of causing the image processing device to cause the command output unit to output the imaging command a plurality of times at a time interval set in advance after the detection signal input unit receives the detection signal as input; a step of causing the image processing device to make the image output unit output at least one of a plurality of captured images obtained according to a plurality of imaging commands; and a step of causing the image processing device to derive the amount of delay for the subsequent observing process based on the time when the imaging command matching the captured image is output and operation contents are received by the operation input unit.

DETAILED DESCRIPTION

Figure 1:
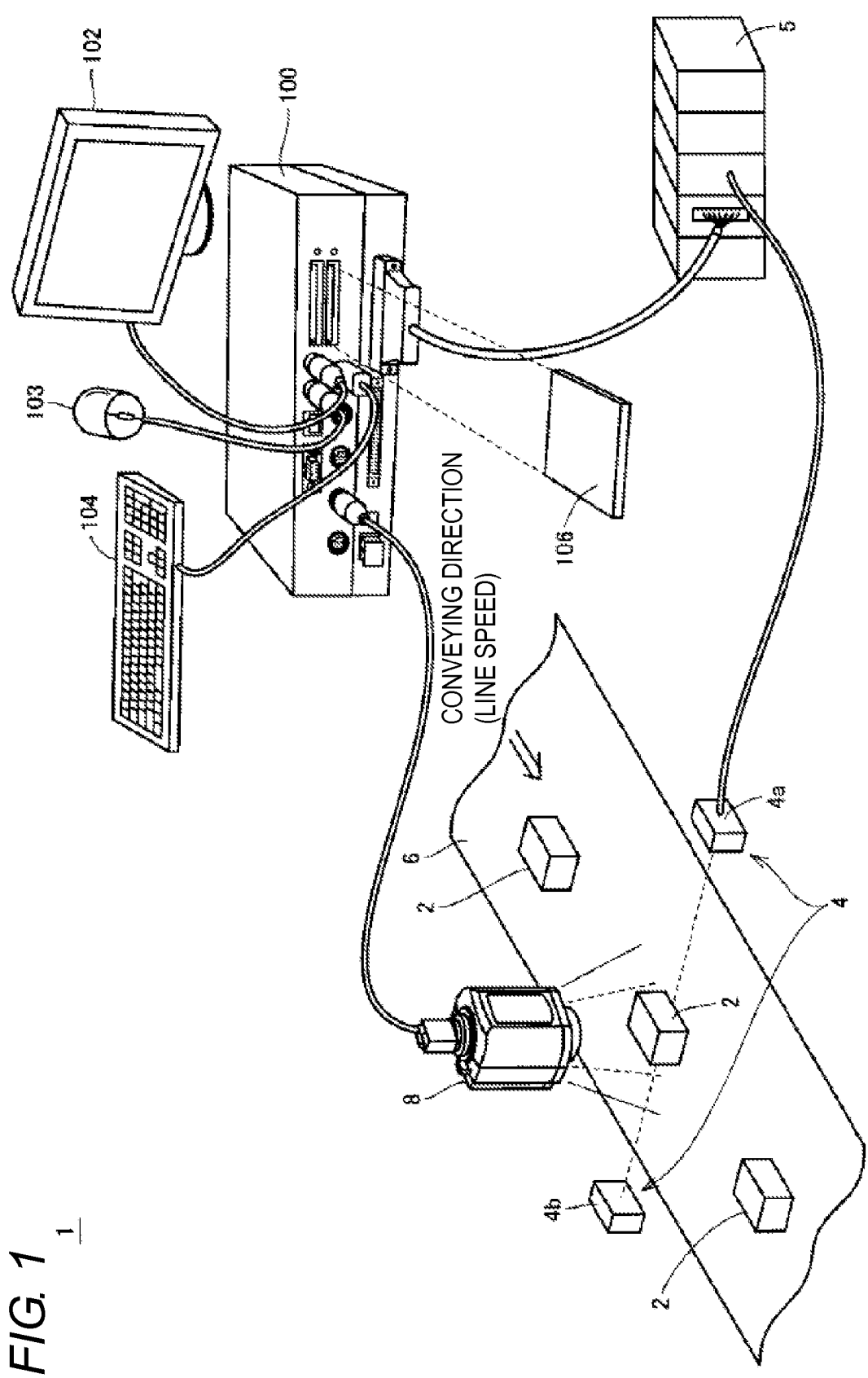
FIG. 1 is a schematic diagram showing an entire configuration of a visual sensor system including an image processing device according to a first embodiment of the present invention.

Hereinafter, preferred embodiments of the present invention are described with reference to the drawings. It should be noted that the same or corresponding parts in the drawings are denoted by the same reference numerals, and description thereof will not be repeated.

Hereinafter, two embodiments of different configurations of an image processing system are described.

(First Embodiment)

FIG. 1 is a schematic diagram showing an entire configuration of a visual sensor system including an image processing device 100 according to an embodiment of the present invention.

In FIG. 1, a visual sensor system 1 is built into an FA production/manufacturing line, and based on a captured image of a target object (hereinafter "work") 2 to be measured, the visual sensor system 1 tests whether there are defects or stains of the work 2 to be measured, measures the size thereof and executes observation processing of, for example, recognizing a letter or graphic on the surface of the work 2. For example, in the present embodiment, the works 2 are conveyed on a conveying path of a conveying mechanism 6 such as a belt conveyer, and the images of the works 2 are captured sequentially by the imaging device 8.

The imaging device 8 includes, for example, an imaging element partitioned into a plurality of pixels such as a CCD (Coupled Charged Device) or a CMOS (Complementary Metal Oxide Semiconductor) sensor in addition to an optical system such as a lens. The imaging element has a plurality of photoelectric sensing elements aligned and formed in an array state, and when receiving an imaging command, the imaging device 8 is driven to read a signal charge from the photoelectric sensing element according to the command. The read signal charge forms an image of one frame. In this way, an image is read from the imaging device 8 in response to the input of the imaging command. This is referred to as "imaging".

The image captured by the imaging device 8 (hereinafter, also referred to as "input image") is transmitted to the image processing device 100. An illuminating mechanism may further be provided to irradiate light onto the works 2, images of which are captured by the imaging device 8.

The imaging device 8 has an angle of view (or view angle). Herein, the angle of view (or view angle) indicates a range in which the imaging device 8 captures images, and this range is the range in which the works 2 can be positioned and is referred to as "imaging range". Accordingly, when the position to install the imaging device is changed, the imaging range is also changed. In the present embodiment, it is assumed that the position to install the imaging device 8 with respect to the conveying mechanism 6 is fixed.

In the visual sensor system 1, it is necessary to generate an entire image of the work 2 as the test target object in order to reliably test the work 2. Hence, the imaging timing of the imaging device 8 is adjusted such that image data can be generated in a state where the work 2 to be conveyed is positioned in the center of the imaging range of the imaging device 8.

The photoelectric sensors 4 arranged at both sides of the conveying mechanism 6 detect that the work 2 has reached the imaging range of the imaging device 8. More specifically, the photoelectric sensors 4 include a light receiving unit 4a and a light projecting unit 4b, which are positioned facing toward a predetermined position of the conveying path of the conveying mechanism 6 and are arranged on a single optical axis, and the photoelectric sensors 4 detect the arrival of the work 2 by detecting in the light receiving unit 4a that light radiated from the light projecting unit 4b is blocked by the work 2. A detection signal of the photoelectric sensors 4 (hereinafter also referred to as "trigger signal") is output to a PLC (Programmable Logic Controller) 5.

The PLC 5 receives the trigger signal from, for example, the photoelectric sensors 4 and controls the conveying mechanism 6.

The visual sensor system 1 further includes the image processing device 100, a display 102 and a keyboard 104. The image processing device 100 is connected with the PLC 5, the imaging device 8, the display 102 and the keyboard 104.

The image processing device 100 has various operation modes, and the operation modes include a measurement mode for executing various image processes for testing the works 2 and an adjustment mode for adjusting the imaging timings of the imaging device 8. In the measurement mode, when receiving the trigger signal from the photoelectric sensors 4 through the PLC 5, the image processing device 100 gives an imaging command to the imaging device 8. In response to this imaging command, the input image obtained by capturing the image of the work 2 by the imaging device 8 is transmitted to the image processing device 100.

In the measurement mode, test processing determines if there is a defect or stain using the captured image of the work 2, measures its size and recognizes a letter or graphic on the surface of the work 2. However, the details thereof will not be described.

The image processing device 100 is a computer with a general-use architecture, and provides various functions, which are described later, by executing a program installed in advance. When such a general-use computer is utilized, an OS (Operating System) for providing basic functions of the computer may be installed in addition to applications for providing the functions according to the present embodiment. In this case, the program according to the present embodiment may be a program that executes processing by calling a necessary module of program modules provided as part of the OS, in a predetermined array at a predetermined timing. That is, the program according to the present embodiment itself does not include the above modules, and executes processing in cooperation with the OS. The program according to the present embodiment may not include part of these modules.

Further, the program according to the present embodiment may be incorporated and provided as part of another program. In this case as well, the program itself does not include the modules included in another program to be combined as described above, and executes processing in cooperation with another program. That is, the program according to the present embodiment may be incorporated in another program as described above.

It should be noted that part or all of the functions provided by executing the program may be implemented as a dedicated hardware circuit.

Figure 2:
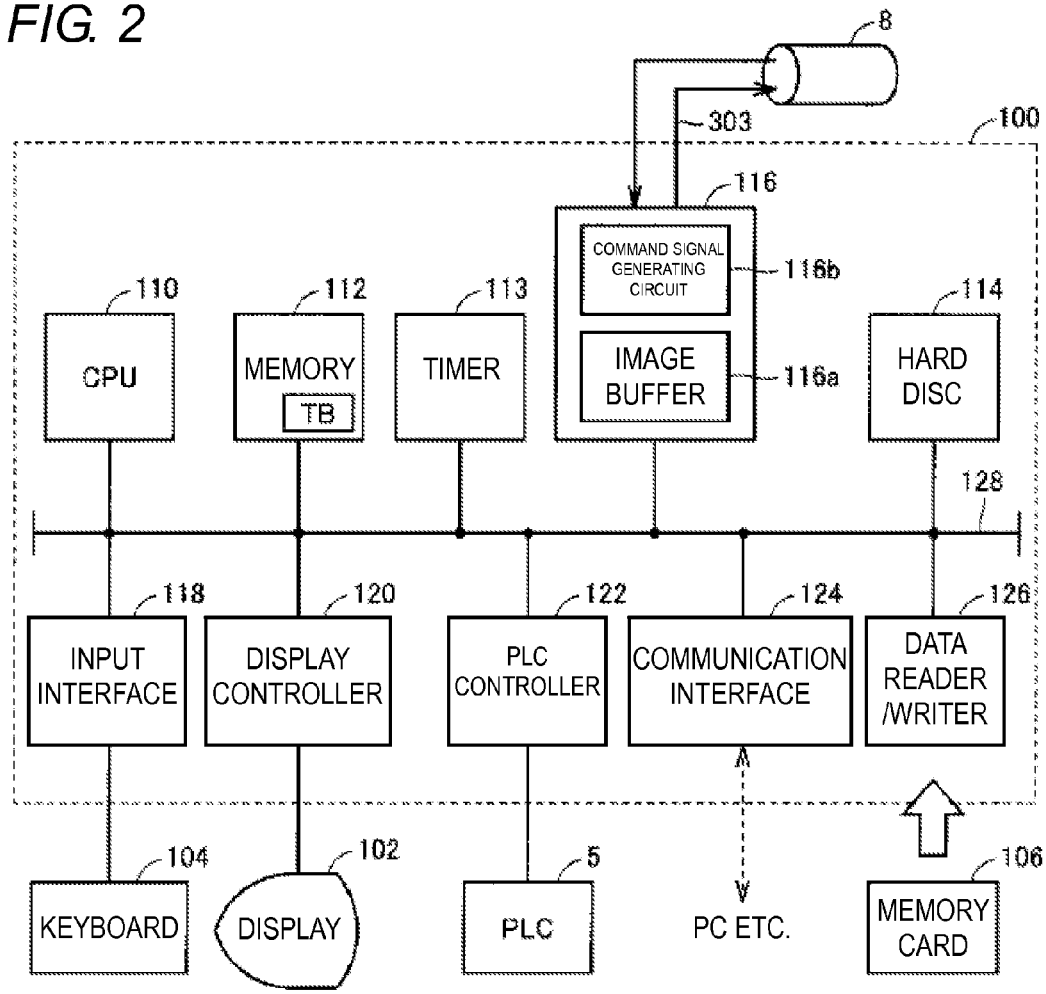
FIG. 2 is a schematic configuration diagram of an image processing device according to the first embodiment of the present invention.

FIG. 2 is a schematic configuration diagram of the image processing device 100 according to the embodiment of the present invention. Referring to FIG. 2, the image processing device 100 includes a CPU (Central Processing Unit) 110, which is a processing unit, a memory 112 and a hard disc 114, which are storage units, a timer 113, which measures the time and outputs the measured data to the CPU 110, a camera interface 116, an input interface 118, a display controller 120, a PLC controller 122, a communication interface 124 and a data reader/writer 126. Each of these units is connected through a bus 128 to enable data communication between one another.

The CPU 110 transfers the programs (codes) stored in the hard disc 114 into the memory 112, and performs various computations by executing these programs in predetermined steps. The memory 112 is typically a volatile storage device such as a DRAM (Dynamic Random Access Memory), and stores an input image acquired by the imaging device 8, data showing the processing result of the input image and work data in addition to the programs and data read from the hard disc 114. The memory 112 stores a table TB which is described later. Further, the hard disc 114 is a non-volatile magnetic storage device, and stores various setting values in advance in addition to the programs executed by the CPU 110. The programs installed in this hard disc 114 are distributed in a state where the programs are stored in the memory card 106 as described later. Further, in addition to the hard disc 114 or in place of the hard disc 114, a semiconductor storage device such as a flash memory may be adopted.

The camera interface 116 transmits data between the CPU 110 and the imaging device 8. More specifically, the camera interface 116 can be connected with one or more imaging devices 8, and has an image buffer 116a that temporarily stores image data from each imaging device 8 and a command signal generating circuit 116b that generates and outputs a signal of an imaging command 303 input from the CPU 110. When data of an input image of at least one frame is accumulated in the image buffer 116a, the camera interface 116 transfers the accumulated data to the memory 112.

The image data is stored in the memory 112 in units of image files. The CPU 110 reads an image file from the memory 112 when an input image is processed. The image file to be read refers to an image (multivalued image) including a plurality of pixels in a two-dimensional array.

The camera interface 116 gives an imaging command to the imaging device 8 according to an internal command generated by the CPU 110.

The input interface 118 handles data transmission between the CPU 110 and an input device such as the keyboard 104, a mouse 103 or a touch panel (not shown). That is, the input interface 118 receives an operation command sent when a user operates the input device.

The display controller 120 is connected with the display 102 that is a typical example of a display device, and notifies the user of the result of image processing in the CPU 110.

The PLC controller 122 handles data transmission between the CPU 110 and PLC 5. More specifically, the PLC controller 122 transmits to the CPU 110 information related to the state of the production line controlled by the PLC 5, or information related to the works.

The communication interface 124 handles data transmission between the CPU 110 and another personal computer or a server device which are not shown. The communication interface 124 typically includes an Ethernet (registered trademark) or a USB (Universal Serial Bus). In addition, as is described later, instead of installing in the image processing device 100 the programs stored in the memory card 106, a program downloaded from a distributing server (not shown) may be installed in the image processing device 100 through the communication interface 124.

The data reader/writer 126 handles data transmission between the CPU 110 and the memory card 106, which is a storage medium. That is, programs to be executed by the image processing device 100 are distributed in a state where the programs are stored in the memory card 106, and the data reader/writer 126 reads a program from this memory card 106. Further, in response to the internal command of the CPU 110, the data reader/writer 126 writes, for example, an input image acquired by the imaging device 8 and/or a processing result of the image processing device 100 into the memory card 106. In addition, the memory card 106 is formed with a general-use semiconductor storage device such as CF (Compact Flash) or SD (Secure Digital), a magnetic storage medium such as a Flexible Disk, or an optical storage medium such as CD-ROM (Compact Disk Read Only Memory).

Further, the image processing device 100 may be connected with another output device such as a printer as necessary.

<Overview>

In the present embodiment, it is assumed that the position to install the imaging device is fixed in an adjustment mode and a measurement mode.

In the adjustment mode, a predetermined time (delay time (or the amount of delay)) until the imaging command is output to the imaging device 8 after a trigger signal is input to the imaging device 100 is set such that an image of the work 2 is captured in the vicinity of the target position of the imaging range (preferably the center position) or, more preferably, when the work 2 is positioned in the target position.

In the measurement mode, the output timing of the imaging command is determined according to the delay time required to capture the image of the work 2 at the timing when the work 2 is positioned in the vicinity of the target position, so that the image is captured reliably when the work 2 to be conveyed reaches the target position of the imaging range (preferably the center position) or its vicinity. Here, it is assumed that the operation mode of the image processing device 100 is switched according to a command sent to the CPU 110 when the user operates the input device.

<Measurement Mode>

In the measurement mode, in a state where the works 2 are conveyed sequentially by the conveying mechanism 6, the imaging device 8 captures an image according to the given imaging command. Accordingly, it is possible to capture images of the works 2 that have arrived in the imaging range. In the measurement mode, the process of outputting the imaging command from the image processing device 100 to the imaging device 8 is described with reference to FIG. 3 and FIG. 4.

Figure 3:
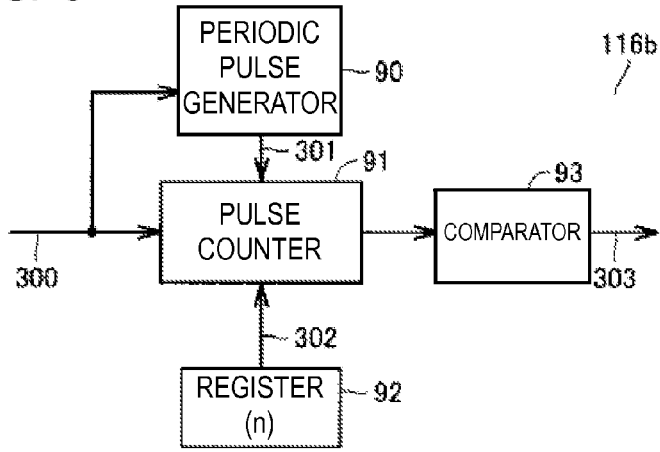
FIG. 3 is a view showing an internal configuration of a trigger signal generating circuit according to the first embodiment of the present invention.

FIG. 3 shows a specific example of a circuit in the command signal generating circuit 116b. The command signal generating circuit 116b includes a periodic pulse generator 90, a pulse counter 91, a resistor 92 and a comparator 93. The register 92 stores a value n of the delay time determined in the adjustment mode. The value of the register 92 is supplied from the CPU 110 and stored, and can be adequately rewritten. A trigger signal 300 is a pulse signal, and is given to the periodic pulse generator 90 and pulse counter 91.

Figure 4:
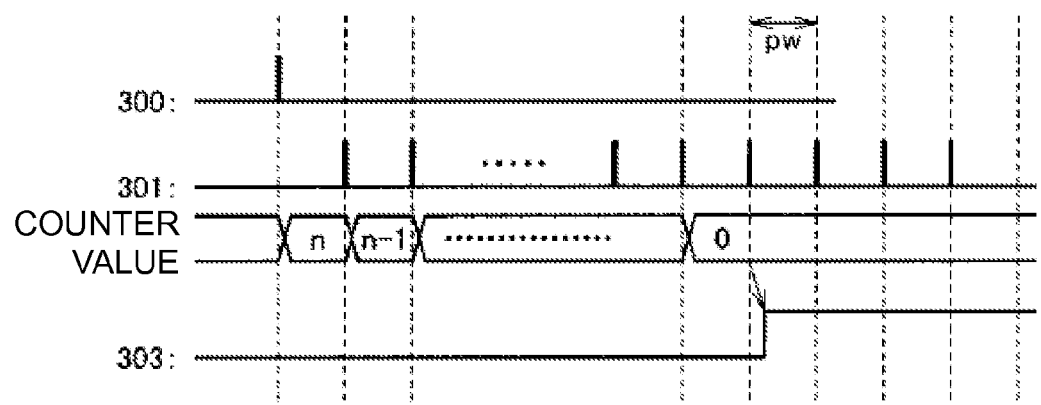
FIG. 4 is a timing chart showing steps of generating a trigger signal according to the first embodiment of the present invention.

FIG. 4 is a timing chart showing a series of operations of the command signal generating circuit 116b in the measurement mode. In FIG. 4, the periodic pulse generator 90 outputs a periodic pulse 301. When receiving the trigger signal 300 as input, the periodic pulse generator 90 resets the operation of outputting the periodic pulse 301 and starts a new period. A period pw of the periodic pulse 301 is set to a value multiplied by a predetermined multiple of the clock period, which determines the operation period of the imaging device 8.

When receiving the trigger signal 300 as input, the pulse counter 91 sets a value n of the delay time in the register 92, to an initial value, and then starts counting down the setting value of the register 92 every time the trigger signal 300 is input.

The comparator 93 takes in the count value of the pulse counter 91 to compare with the value 0, and places the imaging command 303, i.e., an output, in the ON state (high level) when this count value is detected as 0. The imaging command 303 output from the comparator 93 is output to the imaging device 8.

Although as has been described with FIG. 3 and FIG. 4 where the delay value n is set as an initial value of the pulse counter 91 and the imaging command 303 is launched when the count value becomes 0, the actual imaging command 303 needs to have a pulse width required by the imaging device 8 to recognize the command as a trigger for imaging. However, in FIG. 3 and FIG. 4, this configuration is omitted for ease of description.

<Adjustment Mode>

In the present embodiment, methods (1) to (4) for determining a delay time in the adjustment mode are described.

(Method (1))

Figure 5:
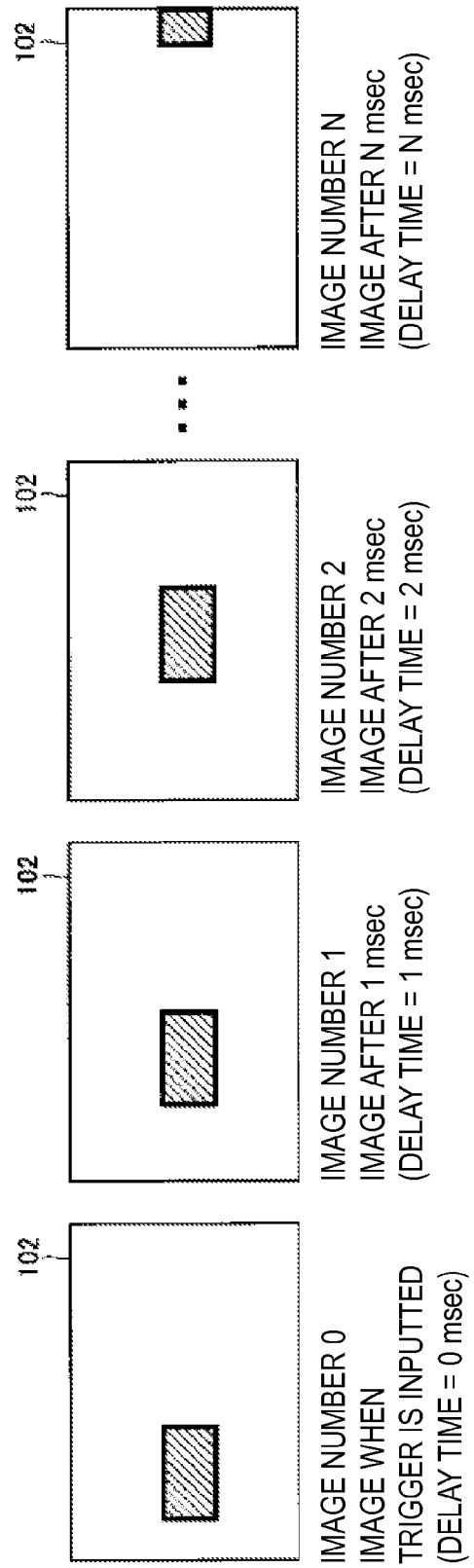
FIG. 5 is a view showing an overview of the process of a method (1) according to the first embodiment of the present invention.

The overview of processing of the method (1) according to the present embodiment is described with reference to FIG. 5. First, the imaging command is output to the imaging device 8 per an adjustment unit time, which is a predetermined time interval after the trigger signal is input, and image files of N captured images (where N is an integer equal to or greater than two) are stored in a predetermined area of the memory 112. In the example of FIG. 5, the adjustment unit time is 1 msec.

When the image file of each captured image is assigned number 0, 1, 2, . . . and N according to the order the images are captured (input order), the memory 112 associates on a one-to-one basis the image file number and the delay time based on time data input from the timer 113. Based on this association, when the image file number is determined, the delay time of the corresponding image file is uniquely determined.

When the delay time is determined, the user selects a desired image from the N images using the image of the display 102 of FIG. 5. By searching in the memory 112 based on the image file number of the selected image, it is possible to read the delay time associated with the image file number. The read delay time is determined as the delay time for the measurement mode.

Figure 6:
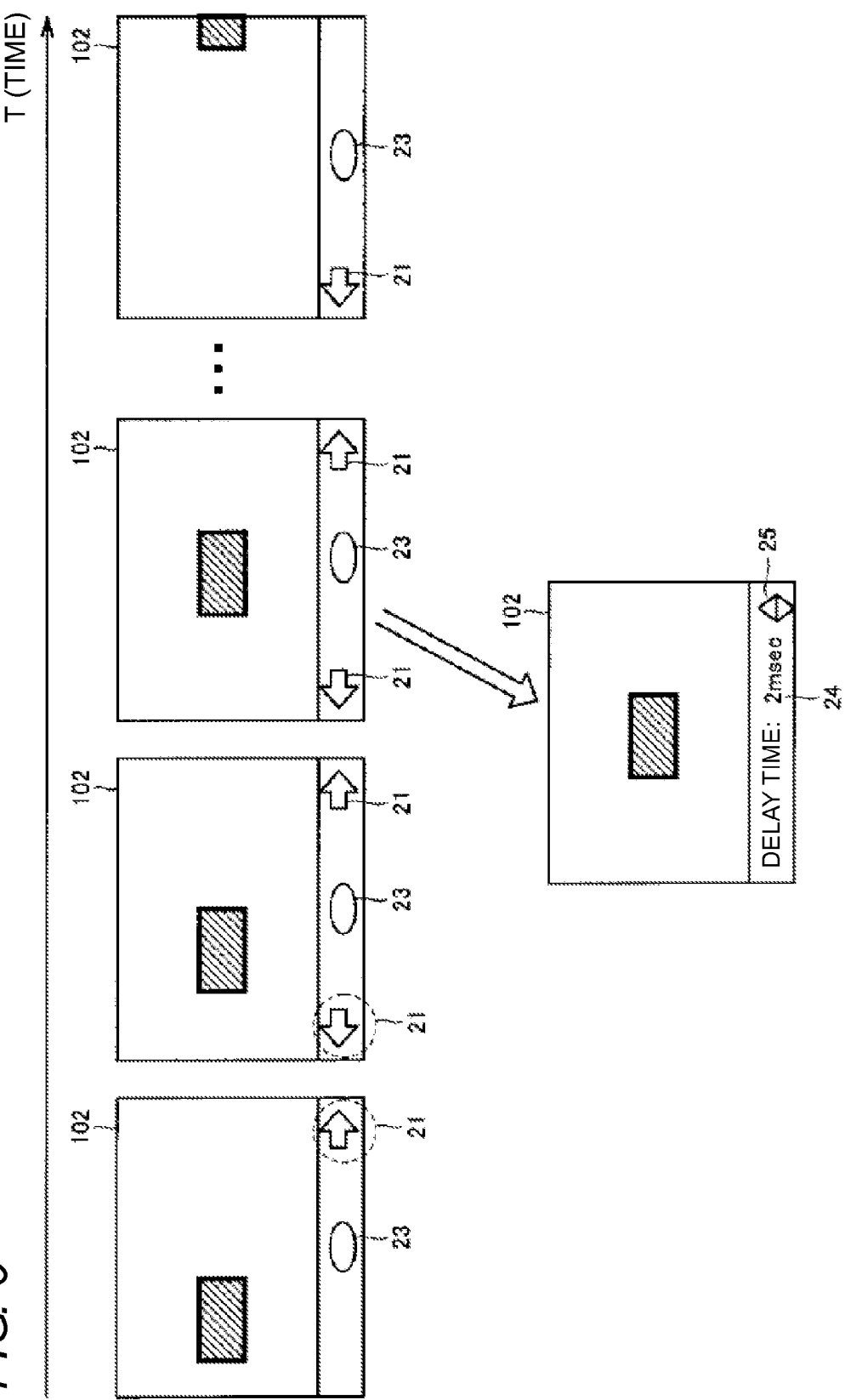
FIG. 6 is a view schematically showing operation steps of the method (1) according to the first embodiment of the present invention.

Steps of selecting a desired image from images of the N image files are described with reference to FIG. 6.

The image files of images captured continuously per adjustment unit time are read from the memory 112 as the time T passes. Here, assume that the display 102 displays one image to be read. When the user performs an operation of forwarding the screen by clicking an arrow button 21 through the input device, an image file of an image captured immediately before or an image file of an image captured immediately after is read and displayed.

The display 102 displays the arrow buttons 21 for switching images and a button 23 to be operated to determine the selected image, together with an image. By operating the left-pointing arrow button 21, the image captured immediately before the image, which is currently displayed is switched and displayed, and, by operating the right-pointing arrow button 21, the image captured in the next place (immediately after) is switched and displayed.

When an image showing the work 2 in a desired position is displayed, the user performs a confirming operation using the button 23. For example, when the third image from the left in FIG. 6 is displayed, if the button 23 is operated, as shown in the lower part of FIG. 6, the delay time (for example, 2 msec) associated with the image file is read from the memory 112 and displayed on the display 102 as a message 24 together with the image to be confirmed.

When the user checks the delay time of the message 24 and makes fine adjustment, the delay time can be adjusted to increase or decrease by operating the button 25 displayed together with the message 24. The delay time associated with the relevant image file of the memory 112 is updated by overwriting the delay time, which has been adjusted to increase or decrease.

When the display 102 has a sufficient display area, the display 102 only needs to display a list of N thumbnail images. In this case, it is possible to omit display of the arrow button 21.

Figure 7:
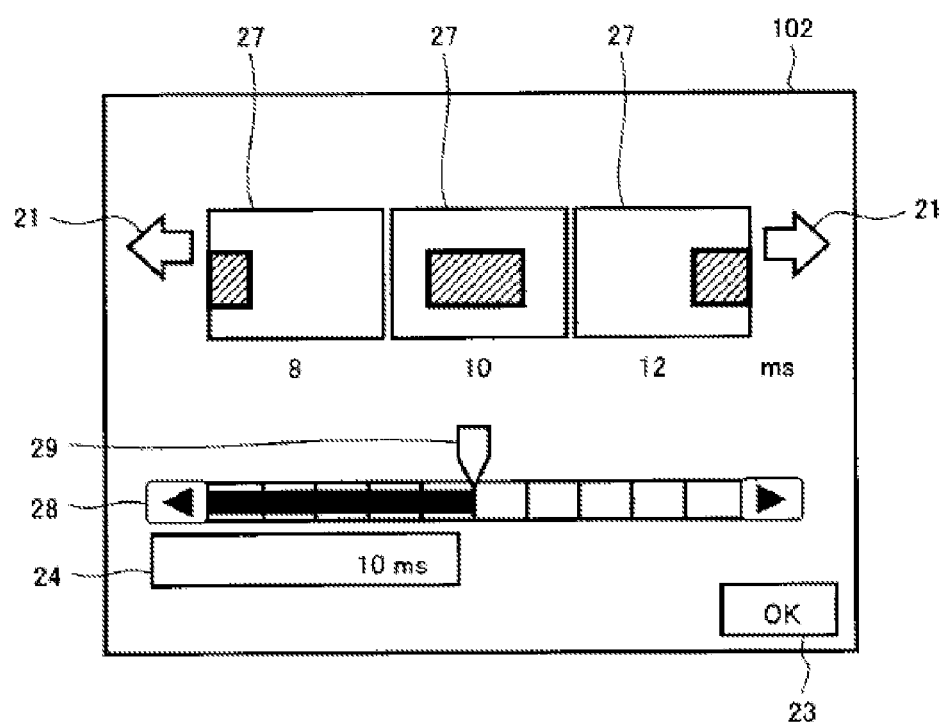
FIG. 7 is a view showing a display screen example of the method (1) according to the first embodiment of the present invention.

Further, the display 102 may align and display thumbnails of some continuous images of the N images. FIG. 7 shows an example where three thumbnail images 27 are displayed. The delay time associated with each image is displayed below each thumbnail image 27. By clicking the arrow button 21 by the input device, the user can move the thumbnail images 27 one by one in a direction in which the delay time is short or long. When the user clicks a desired thumbnail image 27, the delay time associated with the image is displayed as the message 24 and is set in a slide bar 28. Then, the user can adjust the delay time to increase or decrease by operating triangular buttons provided on the left side and right side of the slide bar 28 or a slider 29, and the adjusted delay time is displayed as the message 24. When the user performs a confirming operation using the button 23, the delay time displayed in the message 24 is determined as the delay time for the measurement mode.

Figure 8:
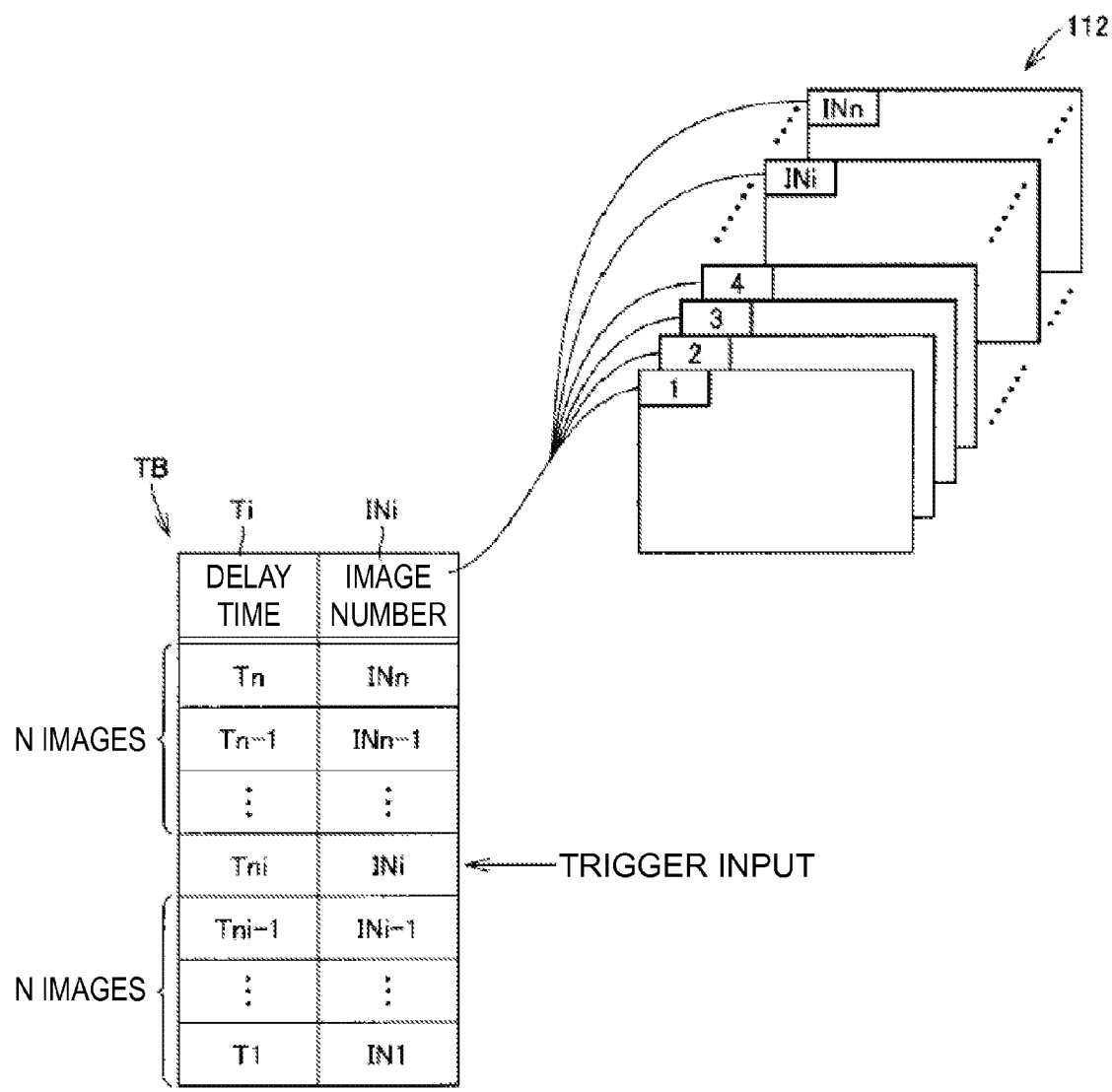
FIG. 8 is a view showing an association between image data and a delay time according to the first embodiment of the present invention.

FIG. 8 shows an example of contents of the table TB in the memory 112. The table TB stores in association a number $IN_i$ (i=1, 2, 3, ... and n) assigned to each image file and the delay time $T_i$ (i=1, 2, 3, ... and n) for each of the images captured per the above adjustment unit time. Using as a reference the image captured when the trigger signal is input from the photoelectric sensors 4 as shown in FIG. 8, the table TB stores data associated with N images captured before the reference and N images captured after the reference.

The process of inputting N pieces of image data at a time point before and after the trigger signal is input is described with reference to FIG. 9. The CPU 110 inputs captured images captured per adjustment unit time and output from the imaging device 8 (step S (hereinafter simply "S") 1). The input captured images are assigned with image numbers in the above units of image files and stored in the memory 112 according to the input order (S3). Next, the CPU 110 determines whether or not to receive the trigger signal as input from the photoelectric sensors 4 through the PLC 5 using the PLC controller 122 (S5). When it is determined that a trigger signal is not input (NO in S5), the step proceeds to processing of S9, which is described later.

In contrast, when it is determined that a trigger signal is input (YES in S5), the image captured when the trigger signal is input is determined (S7). That is, the image file stored in step S3 immediately before the trigger signal is input is determined as an image captured when the trigger signal is input, and an identifier indicating that the image is captured when the trigger signal is input is assigned to the image file.

Next, the CPU 110 determines whether or not input of the captured image is finished (S9). For example, when it is determined that image data is input from the imaging device 8 for a predetermined time based on the counted data of the timer 113, it is determined that the input is finished. Further, when a predetermined number of pieces of image data are input, it is determined that the input is finished.

When it is not determined that the input is finished (NO in S9), the step returns to processing of S1, and the input of image data and the subsequent processing continues.

When it is determined that the input is finished (YES in S9), the image captured when the trigger signal is input and the N captured images before and after the input of the trigger signal are determined (S11). More specifically, the N input image files before and after the image file assigned with the above identifier are searched in the memory 112, and the image numbers $IN_i$ are assigned to the searched N image files before and after the image file according to the input order. At this time, the table TB stores for each of the image files a corresponding image number $IN_i$ and the delay time $T_i$ calculated based on the adjustment time unit. In this manner, input processing of the image data is finished.

Figure 10:
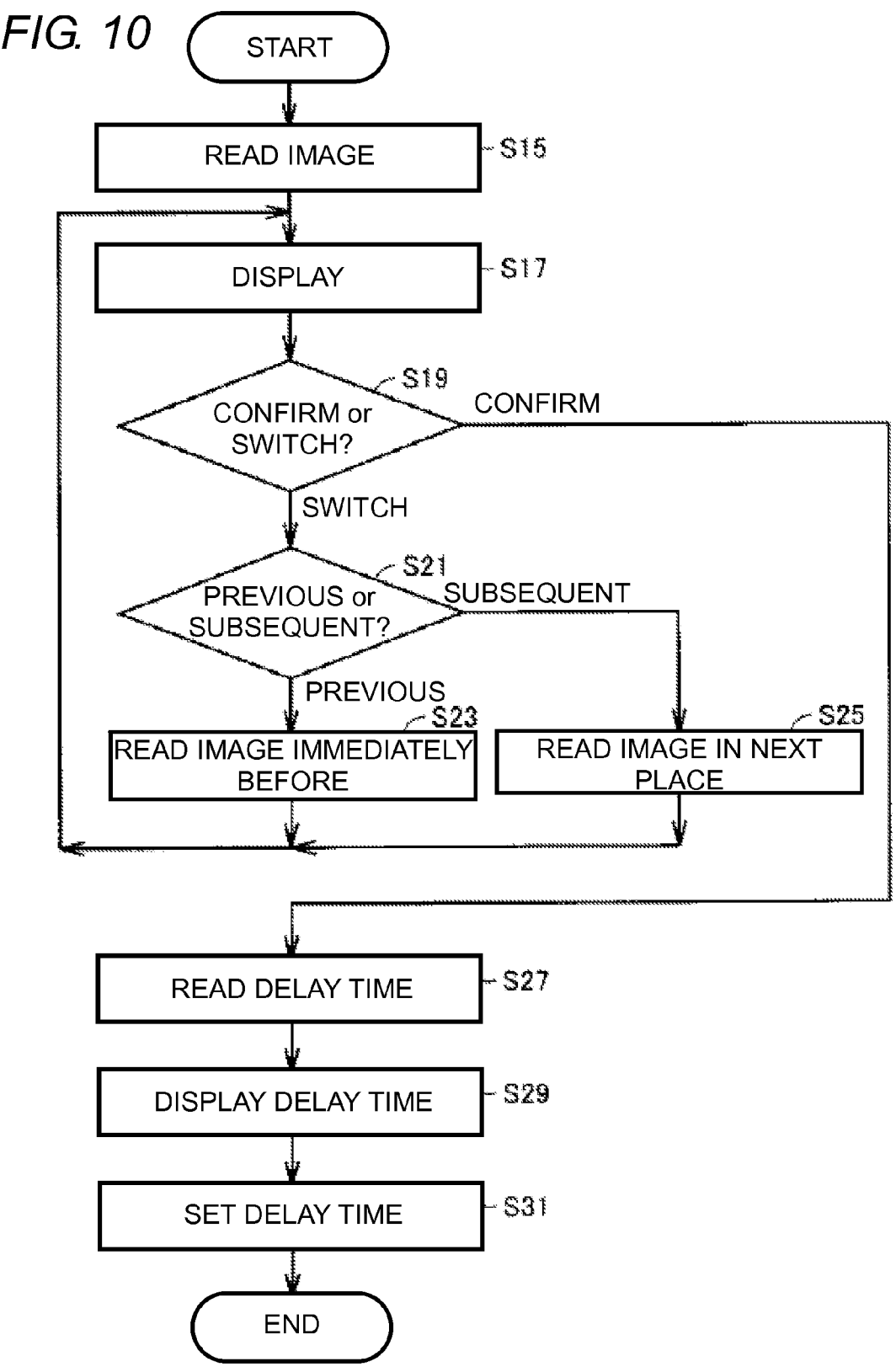
FIG. 10 is a processing flowchart for determining a delay time in the method (1) according to the first embodiment.

FIG. 10 shows processing steps for determining the delay time according to the method (1).

Figure 9:
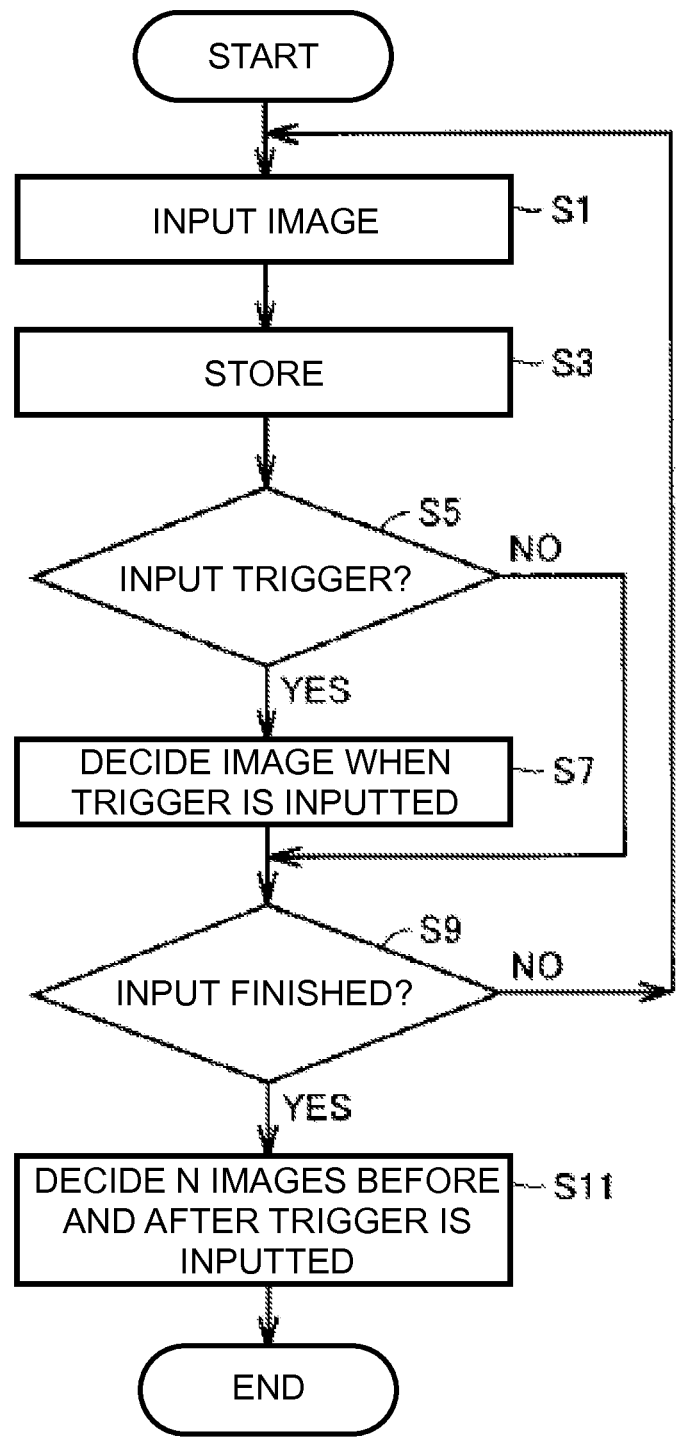
FIG. 9 is a flowchart of image input processing of the method (1) according to the first embodiment of the present invention.

In the adjustment mode, when input processing of image data in FIG. 9 is finished, processing in FIG. 10 for determining the delay time is executed. First, the CPU 110 reads an image file from the memory 112 (S15). The read image file is displayed on the display 102 (S17). Here, assume that image files are read and displayed one by one. As shown in FIG. 4, the user operates the arrow button 21 to switch and display images.

After displaying the image in S17, the CPU 110 determines whether the user operates any of the arrow buttons 21 and the button 23 (S19). When it is determined that the button 23 is operated, processing proceeds to S27, which is described later.

In contrast, when it is determined that the arrow button 21 is operated ("switching" in S19), whether the operated arrow button 21 indicates a left-pointing arrow or a right-pointing arrow is determined (S21). When it is determined that the left-pointing arrow button 21 is operated ("previous" in S21), the CPU 110 searches and reads from the memory 112 the image file associated with the image number ($IN_i-1$) based on the image number $IN_i$ of the image file, which is currently displayed, and switches and displays the image file on the display 102 (S23 and S17). Hereinafter, processing of the image switched and displayed is performed in the same manner.

In contrast, when it is determined that the right-pointing arrow button 21 is operated ("subsequent" in S21), the CPU 110 searches and reads from the memory 112 the image file associated with the image number ($In_i+1$) based on the image number $IN_i$ of the image file, which is currently displayed, and switches and displays the image file on the display 102 (S25 and S17). Hereinafter, processing of the image switched and displayed is performed in the same manner.

Thus, by operating the arrow buttons 21, the user can switch and display the images one by one according to the time when the images are captured.

When the image showing the image of the work 2 in a desired position is displayed, the user operates the button 23 ("confirm" in S19).

Next, in S27, the CPU 110 searches and reads from the table TB the delay time $T_i$ associated with the image number $IN_i$ based on the image number $IN_i$ assigned to the image file, which is displayed when the confirming operation is performed, and displays the delay time $T_i$ as the message 24 on the screen of the display 102 (S29). The delay time determined in this way is set as the delay time value n in the above register 302 (S31). In this manner, processing of determining the delay time is finished.

(Method (2))

Figure 11:
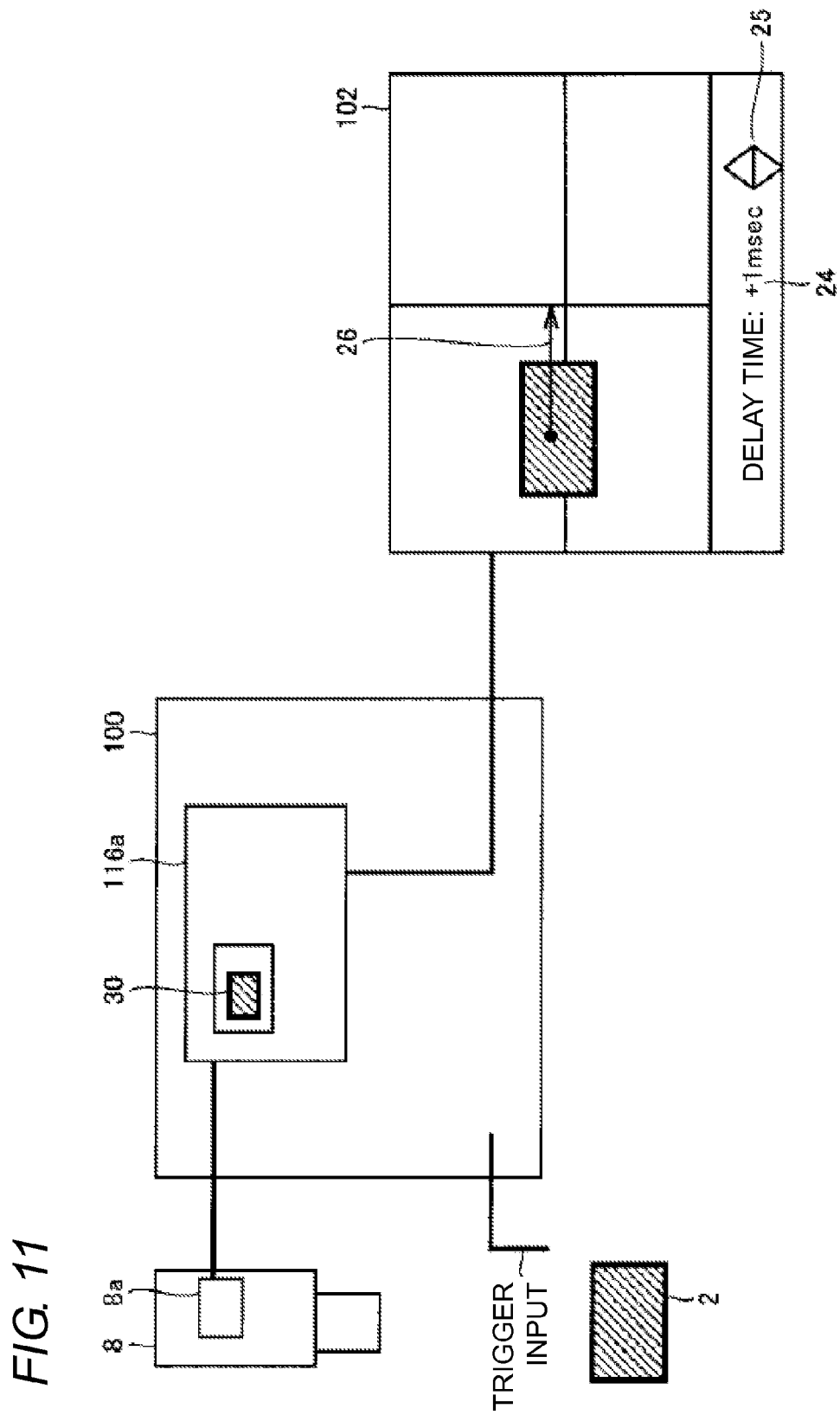
FIG. 11 is a view schematically showing a configuration for determining a delay time in a method (2) according to the first embodiment of the present invention.
Figure 12:
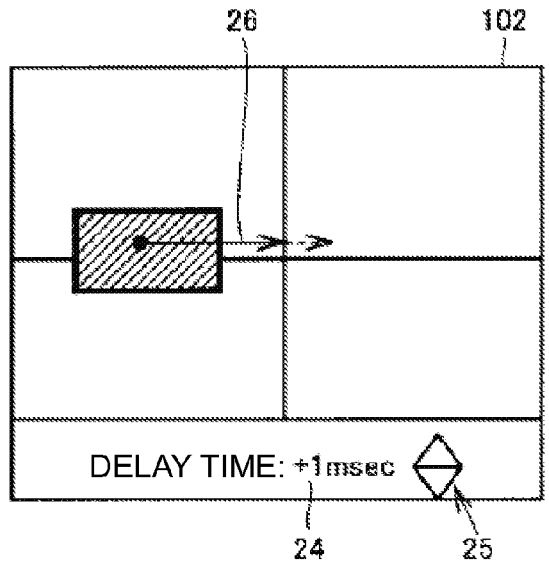
FIG. 12 is a view schematically showing operation steps of the method (2) according to the first embodiment of the present invention.
Figure 13:
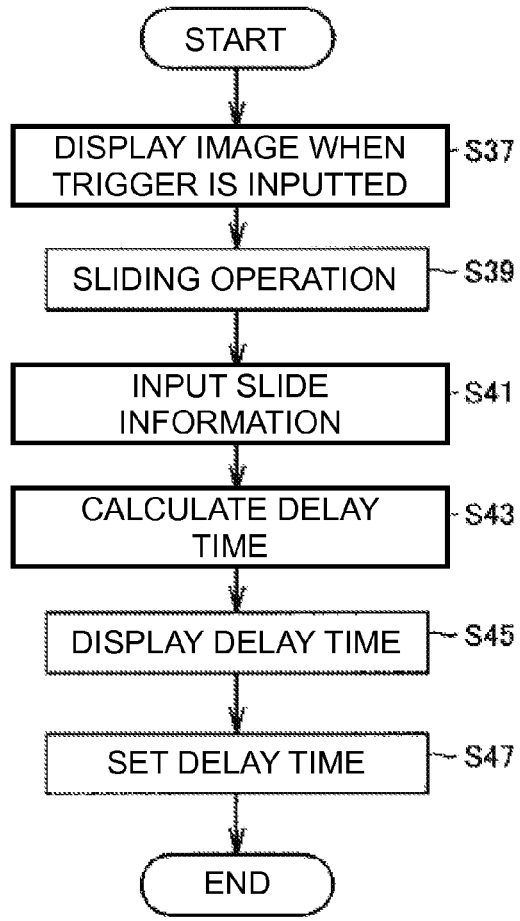
FIG. 13 is a processing flowchart of the method (2) according to the first embodiment of the present invention.

FIG. 11 shows a schematic configuration for determining the delay time in the method (2) according to the present embodiment, FIG. 12 schematically shows an operation image and FIG. 13 shows a flowchart of the process of calculating the delay time by the method (2).

Referring to FIG. 11, in the method (2), when a trigger signal is input to the image processing device 100 from the photoelectric sensors 4, a captured image is output from the imaging device 8a and is stored in the image buffer 116a as image data 30. Then, the image data 30 stored in the image buffer 116a is read and displayed on the display 102.

The CPU 110 displays the arrow 26 extending from the center of the image of the work 2 of the image data 30. The arrow 26 is an image, which is extendable in association with a touch operation by a finger or the operation of the input device of the pointing device such as the mouse 103.

Referring to FIG. 12, the user can extend or shorten the arrow 26 by performing an operation of dragging the tip of the arrow 26 starting from the center of the image of the work 2 on the display 102, using the mouse 103. Crisscross lines to guide the center of the imaging range are also displayed on the image, so that the user can readily specify the desired position of the imaging range. The user performs an operation of sliding and moving the tip of the arrow 26 to the desired position.

According to the flowchart shown in FIG. 13, the CPU 110 searches and reads from the memory 112 the image file upon input of the trigger signal, and displays the image and the arrow 26 on the display 102 (S37).

The CPU 110 detects the amount of the user's sliding operation of the arrow 26 following the operation of the mouse 103 (S39 and S41). Based on the detected amount of operation, the delay time is calculated and the calculated delay time is displayed (S43 and S45). Further, the CPU 110 sets the calculated delay time value n in the register 302 of FIG. 3 for the measurement mode (S47). From the above, calculation and setting of the delay time according to the method (2) is finished.

Here, calculation of the delay time is described. The CPU 110 detects the amount of movement resulting from the sliding operation of the arrow 26, and determines (calculates) the delay time based on the detected amount of movement. The delay time is calculated by detecting the moving distance of the arrow 26 moved by the sliding operation and substituting the detected distance in a predetermined conversion formula. More specifically, the CPU 110 detects the amount of movement (in units of pixels) of the tip of the arrow 26 by the user's sliding operation, and determines (calculates) the delay time based on the amount of movement according to a predetermined formula of converting pixels into msec. The calculated delay time is displayed on the display 102 by means of the message 24. The delay time in the message 24 is displayed while being updated in association with the sliding operation.

In this manner, the user can decide the delay time based on the amount of movement of the arrow 26 by moving the arrow 26 by the sliding operation.

(Method (3))

Figure 14:
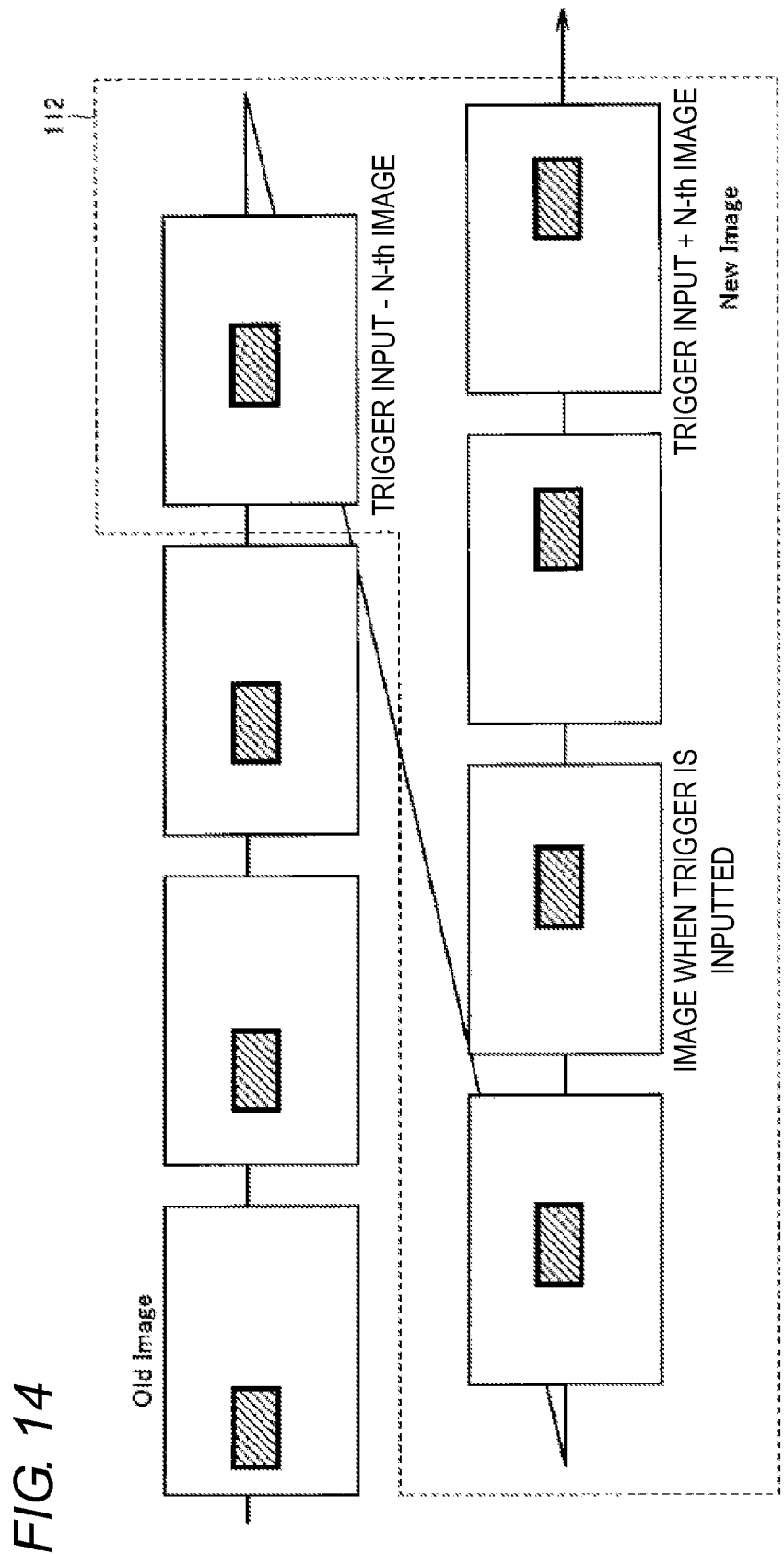
FIG. 14 is a view showing steps of calculating the amount of movement in a method (3) according to the first embodiment of the present invention.
Figure 15A:
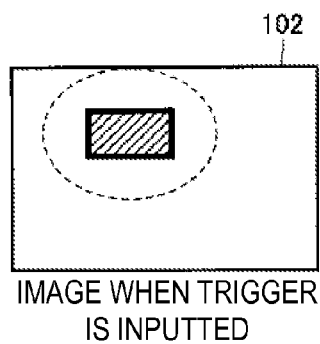
FIG. 15 is a view showing steps of calculating a delay time in the method (3) according to the first embodiment of the present invention.
Figure 15B:
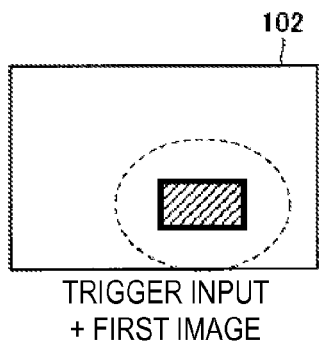
Figure 15C:
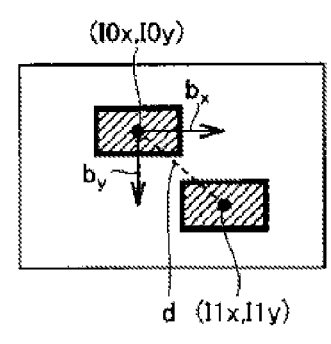

Decision of the delay time according to the method (3) is described with reference to FIG. 14 and FIG. 15. FIG. 14 schematically shows an example where images are stored in the memory 112 according to the method (3).

In a state where the work 2 is conveyed by the conveying mechanism 6, captured images are sequentially output from the imaging device 8 per adjustment unit time. The CPU 110 stores in the memory 112 each of input captured images according to the order of the time sequences the image files are input (captured).

In such a process of inputting the captured images, a trigger signal is input from the photoelectric sensors 4. The image file of the captured image acquired when the trigger signal is input is assigned with an identifier and is stored in the memory 112. When a sufficient number of image files are stored, the CPU 110 searches in the memory 112 the image file of the image captured when the trigger signal is input, based on the identifier. Then, using the image to which the identifier is assigned as the reference, the N image files stored before the reference and the N image files stored after the reference are searched.

The CPU 110 detects the amount of movement and moving direction in the imaging range of the image of the work 2 to determine the delay time using the plurality of searched image files.

Steps of calculating the amount of work movement according to the method (3) are described with reference to FIG. 15. Here, the image of the image file associated with the captured image is formed with a plurality of pixels in a two-dimensional array. That is, a pixel is detected as a coordinate value on the two-dimensional coordinate.

The CPU 110 obtains the number of moving pixels of the work 2, from the images of a plurality of image files searched in the memory 112 as described above.

More specifically, the images of a plurality of image files searched as described above are read from the memory 112 and displayed on the display 102. The number of moving pixels of the work 2 is detected for images of two image files specified by the user through the input device, from a plurality of image files to be displayed.

Here, assume that the image file of the image captured when the trigger signal is input (see FIG. 15A) and the image file of the captured image in the next place (see FIG. 15B) are specified. The CPU 110 detects the coordinates of pixels of the two specified image files, and calculates according to Equation 1 the distance d between two points of the coordinates (I0x, I0y) of the pixels in a predetermined position of the image of one image file and the coordinates (I1X, I1y) of the pixels in a position matching the image of the other image file (see FIG. 15C). The distance d refers to the amount of movement.

[Formula 1]

$$\text{distance } d = \sqrt{(I1x-I0x)^2 + (I1y-I0y)^2} \quad \text{(Equation 1)}$$

This detection of the coordinate positions of pixels uses methods which are conventionally proposed. For example, these methods include inputting the coordinates by a human hand, detecting the position by pattern matching and detecting the moving body based on a difference between moving images. The methods are well known and therefore are not described in detail.

Next, the delay time is calculated based on the amount of movement (distance d).

To calculate the delay time, the CPU 110 first calculates the moving speed S of the work 2 (unit: pixel/msec) using an equation of S=(amount of work movement between adjacent images (distance d)/(time T required to take in one image). Here, the time T required to take one captured image in the image processing device 100 is uniquely calculated based on the setting value of the imaging device 8a and the data transfer speed between the imaging device 8a and the memory (buffer 106b), so that the time T is calculated as a known value and can be stored in advance in the memory 112. Accordingly, when the moving speed S of the work 2 is calculated, the time T can be acquired by reading from the memory 112.

According to this calculation formula, the time required to move over the distance d is calculated as 1/S (msec) and is calculated as the delay time.

(Method (4))

Figure 16:
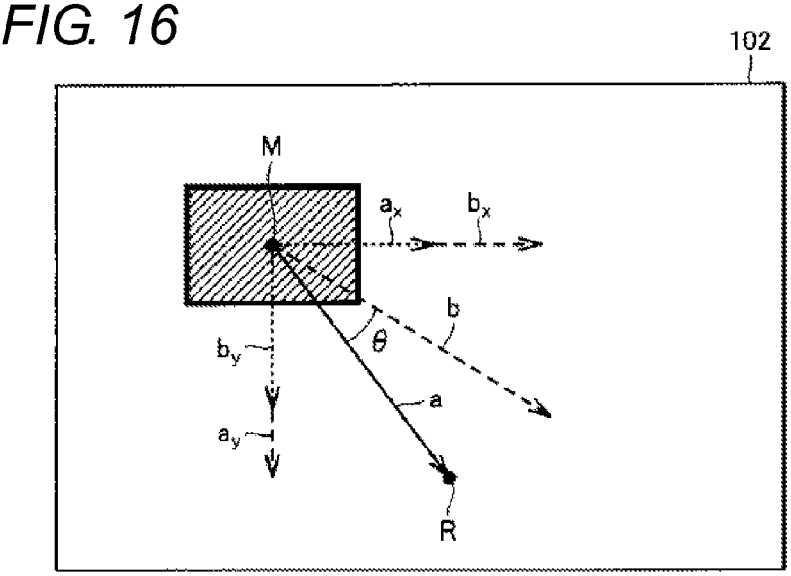
FIG. 16 is a view showing the decision of a delay time in a method (4) according to the first embodiment of the present invention.

Determination of the delay time according to the method (4) is described with reference to FIG. 16. It is assumed that the memory 112 stores a plurality of image files as shown in FIG. 14.

Here, it is assumed that the method (3) calculates the delay time (1/S (msec)) per pair of images of adjacent image files stored in a time sequence, that is, images of two image files of continuous image number INi values, and stores in the memory 112 the delay time in association with a pair of the corresponding image files.

The CPU 110 sequentially reads image files from the memory 112 and displays the image files on the display 102 one by one.

The user selects and specifies a desired image of the image files to be displayed. When the desired image is selected and specified, the CPU 110 displays a mark M indicating the coordinate position of the desired image (for example, the center position coordinate of an image) on the image of the work 2 in the display image.

The user inputs a vector a for calculating the delay time to the selected image by operating the input device. The start point of the vector a matches the position of the mark M, and the end point indicates the position R of the moved mark M, which is desired by the user. The vector a is displayed by being superimposed on the image of the display 102 (see FIG. 16). FIG. 16 shows a case where the image captured when the trigger signal is input is selected. The direction and length of the vector a refers to the moving direction and moving distance of the work 2 to a position of the imaging range, which is desired by the user. The desired position is typically the center position of the imaging range such that the entire image of the work 2 can be captured.

When the vector a is input, the CPU 110 performs correction processing for calculating the delay time indicated by the input vector a using a vector b (see FIG. 16) indicating the actual moving direction and moving distance of the work 2 conveyed by the conveying mechanism 6 in the imaging range. In FIG. 16, the vector a is indicated by vector ax+vector ay, and the vector b is indicated by vector bx+vector by.

For correction processing, the amount of correction used for correction is calculated according to Equation 2 using the inner product of the vector a and vector b. In this case, θ refers to the angle made between the vector a and vector b detected by the CPU 110.

[Formula 2]

Amount of correction=$|a|\cdot|b|\cdot\cos\theta$ [pixel]  (Equation 2)

The CPU 110 calculates the delay time specified by the vector a according to Equation 3 to which the calculated amount of correction and work movement amount (the calculation formula of the delay time (1/S (msec)) are applied.

Delay time=amount of correction×1/S (msec)  (Equation 3)

As described above, the user can decide the delay time such that an image is captured when the work 2 reaches a desired position of the imaging range, by inputting the vector a indicating the moving direction and moving distance to the position desired by the user in the imaging range, to the image of the work 2 of the selected captured image.

(Second Embodiment)

A second embodiment is described with reference to FIG. 17 to FIG. 21.

Although the image processing device 100 and imaging device 8 are individually and separately provided in the first embodiment, both functions may be provided integrally as in the present embodiment.

Figure 17:
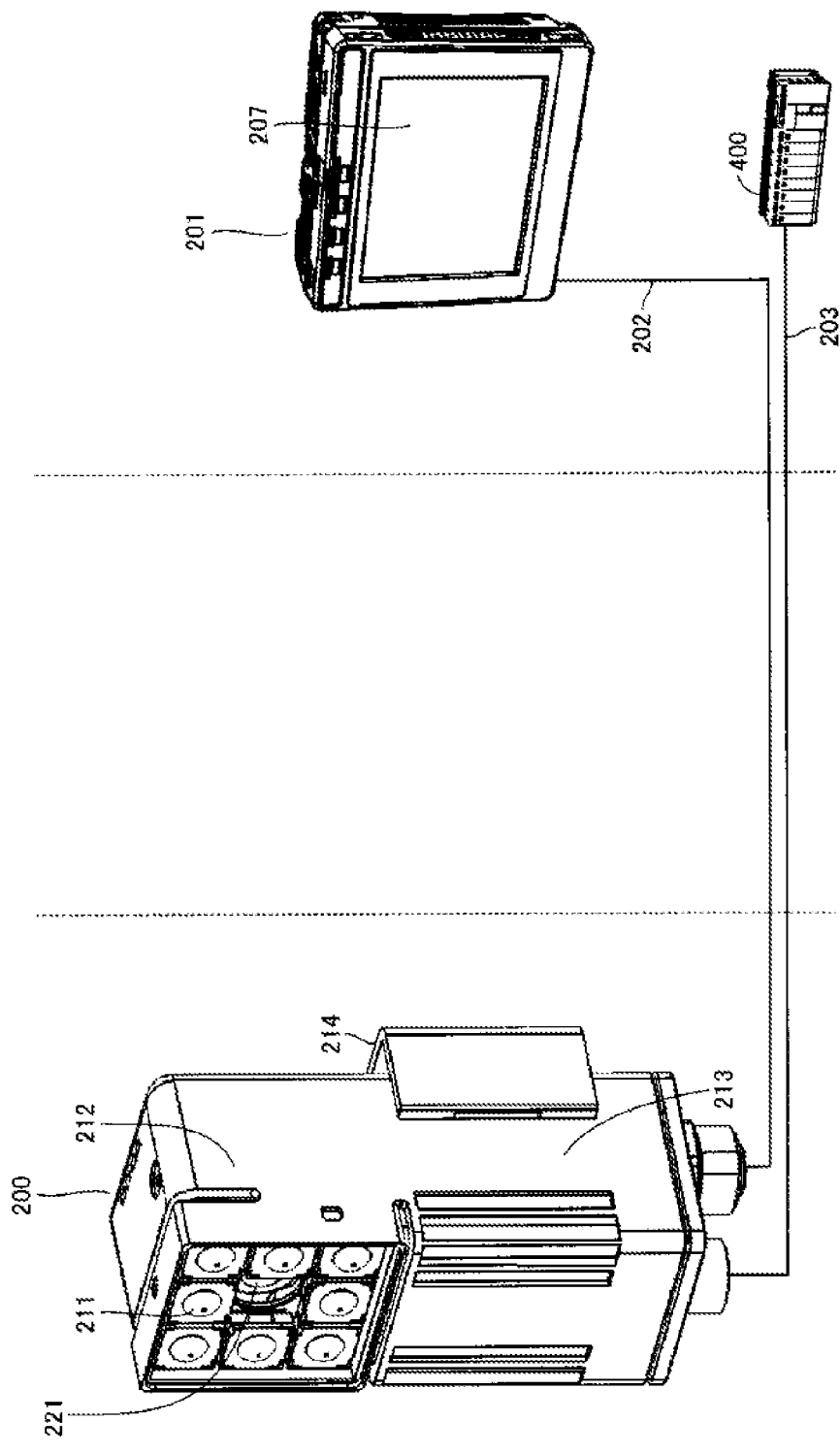
FIG. 17 is a schematic diagram showing the entire configuration of a visual sensor system including an image processing device according to a second embodiment of the present invention.

Referring to FIG. 17, a visual sensor system according to the second embodiment includes an image processing device 200 that has an imaging function and an image processing function, a display setting unit 201 that has the function of displaying a processing result of the image processing device 200 and the function of inputting the user's command, and a transmission cable 202 that is provided to exchange data and signals between the image processing device 200 and the display setting unit 201. Further, the image processing device 200 is connected to communicate with a PLC (Programmable Logic Controller) 400 through the IO cable 203. The PLC 400 controls the entirety of the visual sensor system by receiving signals from the other devices and transmitting signals to the other devices.

In the present embodiment, the image processing device 200 integrally has the function of the imaging device 8 and the function of the image processing device 100 of the first embodiment. The image processing device 200 is provided separately from the display setting unit 201 corresponding to the display device that displays a captured image and processing result. Accordingly, the user can check the captured image and processing result while carrying the display setting unit 201 and moving.

The image processing device 200 has an imaging unit 212 and controller unit 213, and the imaging unit 212 has an illuminating unit 211 and an imaging lens 221. A microcomputer is built in the controller unit 213. In the housing of the image processing device 200, an attachment part 214 that attaches the image processing unit 200 to a supporting member (not shown) is disposed.

The display setting unit 201 has an LCD (Liquid Crystal Display) touch panel 207 that is formed integrally with an LCD and a touch panel for inputting a command of an operation by touching an LCD screen with a finger or dedicated pen. The display setting unit 201 receives image data captured by the imaging unit 212 to display on the LCD touch panel 207, and transmits the command of the user's operation input from the LCD touch panel 207, to the controller unit 213 of the image processing device 200.

Figure 18:
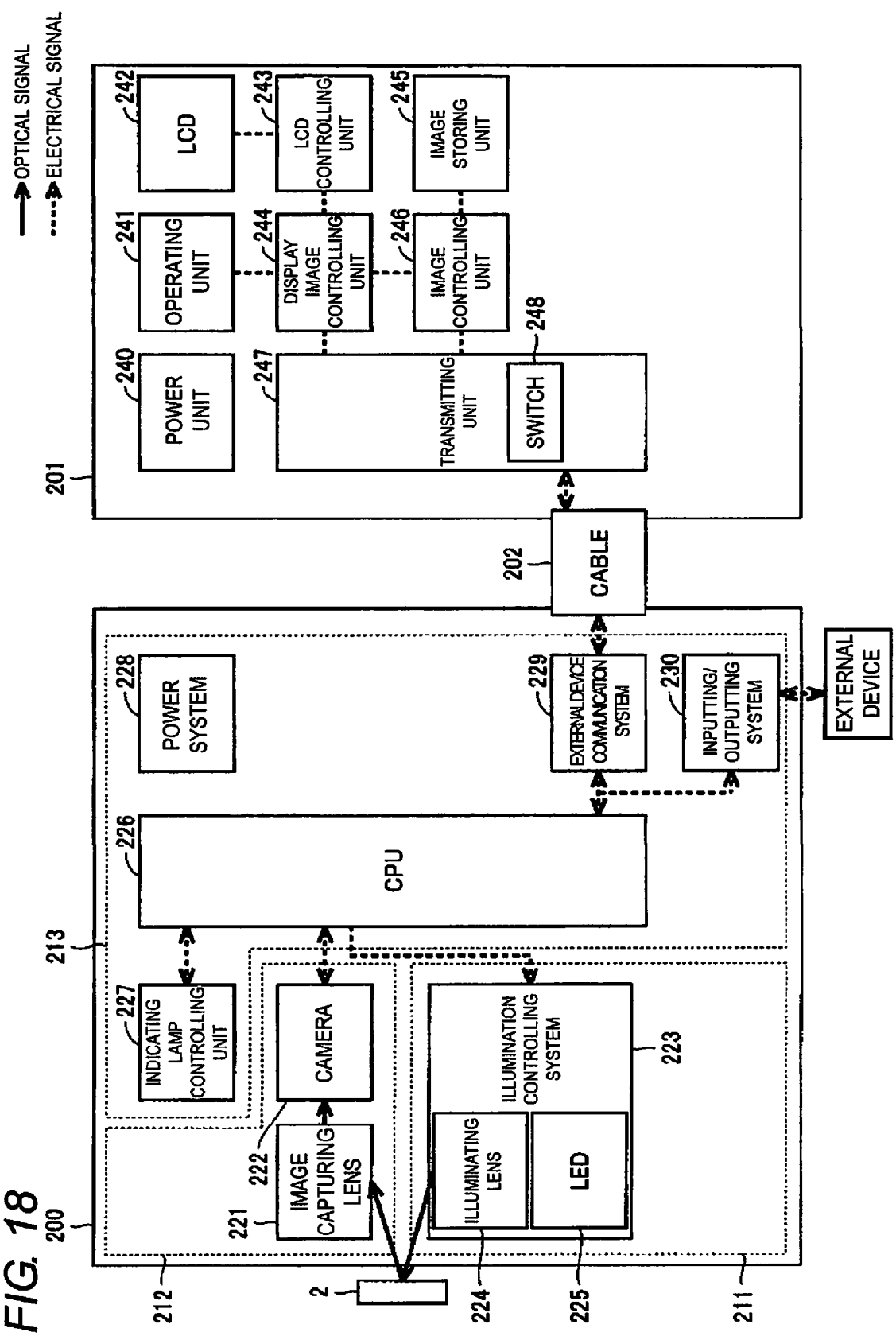
FIG. 18 is a functional block diagram according to the second embodiment of the present invention.

A block configuration of the image processing device 200 and the display setting unit 201 is described with reference to FIG. 18. The image processing device 200 includes the illuminating unit 211, an imaging unit 212 that captures an image of the work 2 and a controller unit 213. The imaging unit 212 has the imaging lens 221 and a camera 222. The camera 222 has the function corresponding to the imaging device 8.

The illuminating unit 211 includes an illumination controlling system 223 that has an illuminating lens 224 and an LED (Light Emitting Diode) 225.

The controller unit 213 includes an indicating lamp controlling unit 227 that controls an indicating lamp such as a lamp (not shown), a CPU 226 that controls the image processing device 200, a power system 228 that supplies power to each unit, an external device communication system 229 that is connected to the transmission cable 202 and an inputting/outputting system 230 that performs input and output to and from an external device.

The display setting unit 201 includes a power unit 240 that supplies power to each unit, an operating unit 241 that supports the touch panel, an LCD 242, an LCD controlling unit 243 that controls the LCD 242, a display image controlling unit 244 that controls display of an image on the LCD 242 through the LCD controlling unit 243, an image storing unit 245 that stores images, an image controlling unit 246 and a transmitting unit 247. The display setting unit 201 has a microcomputer, and the microcomputer controls the functions of the LCD controlling unit 243, the display image controlling unit 244 and the image controlling unit 246.

The transmitting unit 247 is connected to the transmission cable 202, and has a switch 248 for switching inputs. In the present embodiment, a plurality of image processing devices 200 can be connected to the display setting unit 201 through the transmission cable 202. The transmitting unit 247 has a plurality of input ports for communicating with a plurality of image processing devices 200. The switch 248 selects one of the plurality of input ports according to the command of the microcomputer, so that the display setting unit 201 can communicate with the image processing device 200 connected to the selected input port.

In the present embodiment, the image processing unit 200 has processing functions for, at least, the above-described measurement mode and adjustment mode, and the display setting unit 201 has an input unit, which allows a simple user operation and has a function of receiving as input and transmitting a user's command and the amount of operation for these processes, to the image processing device 200. Further, information of a processing result (image and message 24) is transmitted to the display setting unit 201 from the image processing device 200 and is displayed on the LCD.

In addition, a plurality of image processing devices 200 and the display setting unit 201 are connected by wireless communication and mutually transmit and receive information such as the delay time.

Figure 19:
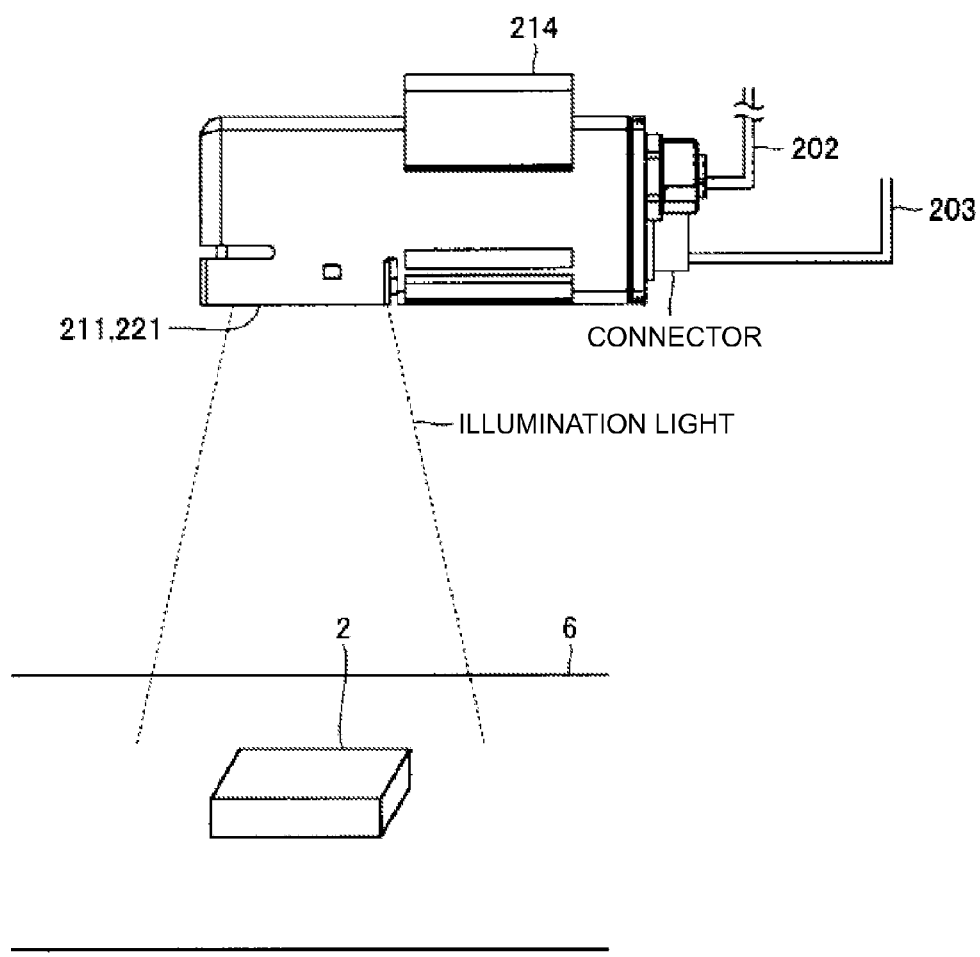
FIG. 19 is a view showing a mode of attaching an image processing device to a conveying line according to the second embodiment.
Figure 20:
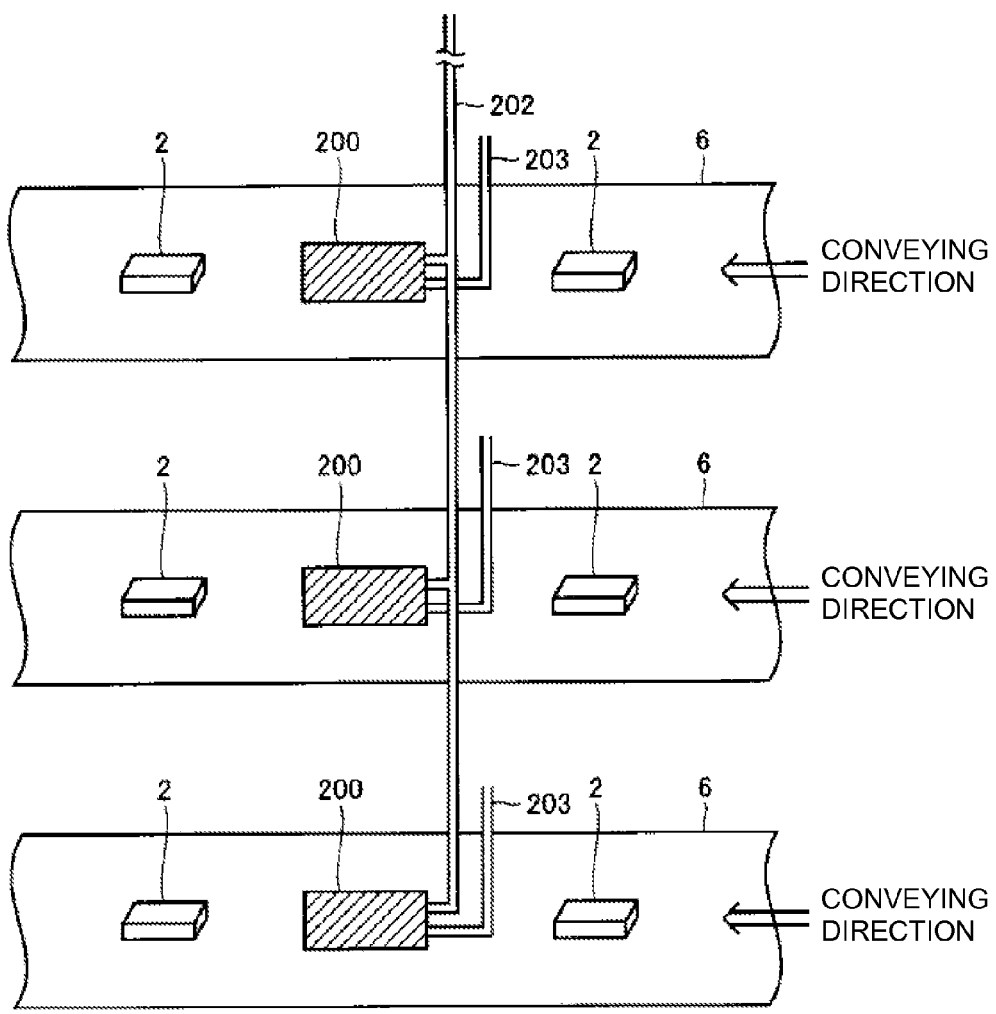
FIG. 20 is a view schematically showing a state where image processing devices are attached to each of a plurality of conveying lines according to the second embodiment.

FIG. 19 shows an example of a mode of attaching the image processing device 200. FIG. 20 shows a state where the image processing device 200 is attached to each conveying line such as belt conveyers, which are a plurality of conveying mechanisms 6 seen from the upper direction of the conveying lines. The image processing device 200 matching each conveying line is attached to the supporting member (not shown), by way of the attachment part 214 such that the imaging range of the camera 222 matches over the conveying lines. When an image is captured, illumination in the imaging range is provided by radiating illumination light on the conveying line of the conveying mechanism 6. The image processing devices 200 provided for each conveying line mutually transmit and receive, for example, information of the delay time through the transmission cable 202.

Figure 21B:
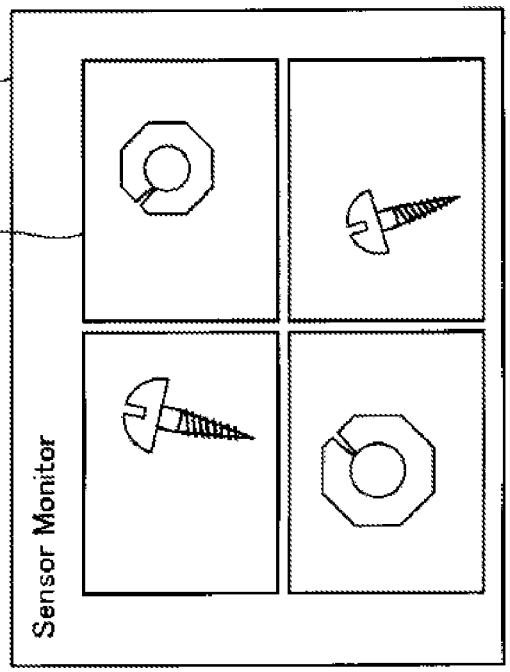
FIG. 21 is a view showing an example of a display screen according to the second embodiment.
Figure 21A:
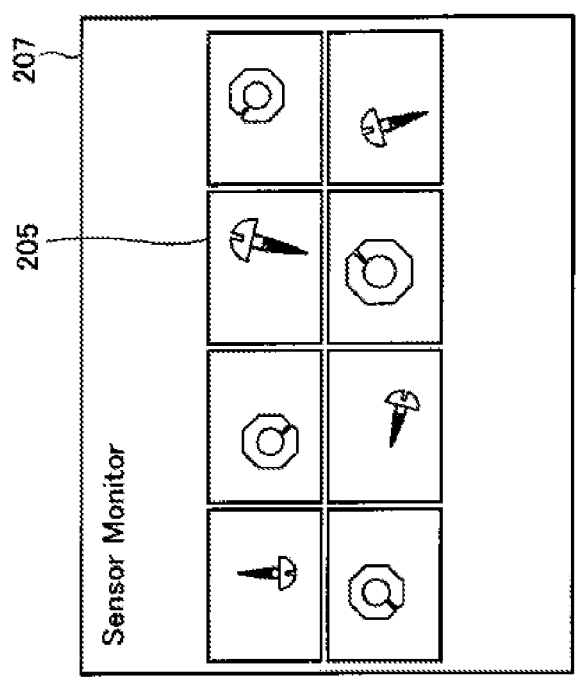

FIG. 21 shows a display screen example of the LCD touch panel 207 when the display setting unit 201 simultaneously monitors a plurality of image processing devices 200. In the screen, thumbnail images 205 of captured images of each imaging device 200 are aligned and displayed. FIG. 21A shows an example where the number of image processing devices 200 simultaneously connected to the display setting unit 201 is eight, and FIG. 21B shows an example where the number of image processing devices 200 is four. Thus, the number and size of thumbnail images 205 may be automatically switched depending on the number of image processing devices 200. Further, in the measurement mode, not only captured images of each imaging device 200, but also the result of image processing may be displayed on the screen.

Figure 21C:
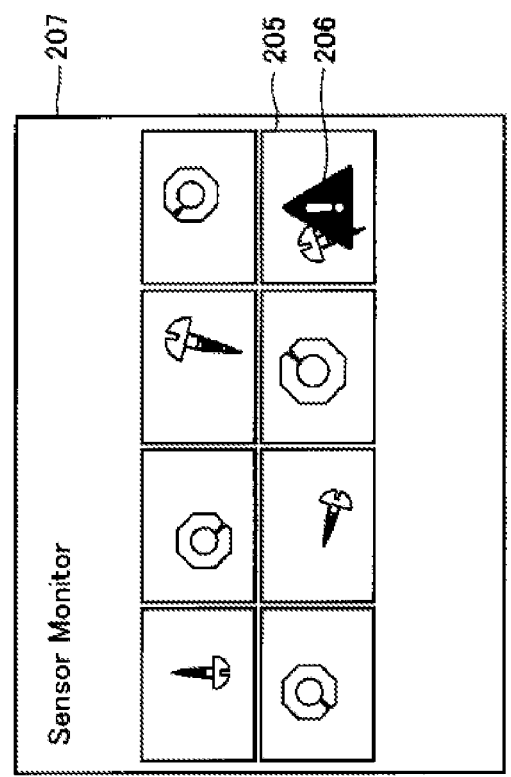

FIG. 21C shows an example where an exclamation mark 206 is displayed in the thumbnail image 205 of the image processing device 200 in which the required setting is not made in the adjustment mode. When the user clicks the thumbnail image 205 through the input device, it is possible to transition to the adjustment mode for setting the corresponding image processing device 200. Further, in the measurement mode, when abnormality of the work 2 is found as a result of test by a specific image processing device 200, it may be possible to automatically transition to the screen, which displays the captured image and processing result of only the image processing device 200.

According to the second embodiment, the user can set the delay time based on the captured images from a plurality of image processing devices 200 using one display setting unit 201, so that it is possible to adjust and determine the delay times of the respective image processing devices 200 referring to output information of one display setting unit 201.

In sum, the image processing device and the image processing program explained above can quickly decide the amount of delay for specifying an imaging timing. In other words, the amount of delay can be quickly determined without requiring the user to repeat the operation of the input unit.

The embodiments disclosed herein are illustrative in all aspects and should not be construed as being restrictive. The scope of the invention is defined by the claims rather than by the description of the embodiments made above, and all modifications within the meaning and the scope equivalent to the claims are intended to be encompassed.

What is claimed is:

1. An image processing device for processing a captured image of a target object under observation, the image processing device comprising:
    an imaging device for capturing a plurality of images of the target object, the target object being conveyed on a conveying path;
    a sensor for sending a detection signal when the target object reaches an imaging range of the imaging device; and
    an image processing device comprising:
        a detection signal input unit for receiving a detection signal from the sensor;
        a command output unit for outputting an imaging command to the imaging device;
        an operation input unit for receiving operation data from an external source;
        an image output unit for outputting an image to a display device; and
    a delay amount setting unit for setting an amount of delay for controlling output timing of the imaging command from the command output unit, the amount of delay being time interval between the detection signal input unit receiving the detection signal and the command output unit outputting the imaging command in an observation process of the target object, wherein
    the delay amount setting unit is configured for
        acquiring a target position in a first captured image of a first target object based on the operation data;
        instructing the command output unit after a predetermined time interval to output the imaging command to the imaging device after the detection signal input unit receives the detection signal;
        detecting a position of the first target object in a second captured image of the first target object acquired after instructing the command output unit to output the imaging command to the imaging device;
        deriving, for a subsequent observation process, the amount of delay required to capture an image of a target object conveyed near the acquired target position based on relationship between the acquired target position in the first captured image and the detected position of the first target object in the second captured image; and
        setting the derived amount of delay as the time interval between the detection signal input unit receiving the detection signal and the command output unit outputting the imaging command in the subsequent observation process,
    wherein the amount of delay is derived from an amount of correction and a moving speed of the first target object, and the amount of correction is calculated by an inner product of a first vector indicative of a moving direction and moving distance of the first target object to the targeted position and a second vector indicative of moving direction and moving distance of the first target object conveyed on the conveying path in the imaging range.

2. The image processing device according to claim 1, wherein
    the operation input unit includes a selection operation input unit for receiving the operation data to select at least one captured image of the plurality of captured images, and
    the delay amount setting unit is configured for
    storing the amount of delay associated with each of the plurality of captured images; and
    the image output unit is configured to output the amount of delay associated with each one of the plurality of captured images together with the respective captured image.

3. The image processing device according to claim 2, wherein the operation data includes data for increasing/decreasing of the amount of delay associated with each one of the plurality of captured images, and the delay amount setting unit increases or decreases the amount of delay associated with each one of the plurality of captured images according to the operation data.

4. The image processing device according to claim 2, wherein the image output unit is switchable to output between selected captured images in the plurality of captured images.

5. The image processing device according to claim 2, wherein the image output unit is configured to output a list of the plurality of captured images.

6. A non-transitory machine storage medium, having stored thereon machine-readable instructions for executing an image processing method for processing a captured image of a target object under observation, the image processing method comprising:

capturing a plurality of images of the target object using an imaging device, the target object being conveyed on a conveying path;

sending a detection signal when the target object reaches an imaging range of the imaging device using a sensor;

receiving a detection signal from the sensor;

outputting an imaging command to the imaging device;

receiving operation data from an external source;

outputting an image to a display device;

setting an amount of delay for controlling output timing of the imaging command, the amount of delay being time interval between receiving the detection signal and outputting the imaging command in an observation process of the target object, acquiring a target position in a first captured image of a first target object based on the operation data;

outputting after a predetermined time interval the imaging command to the imaging device after receiving the detection signal;

detecting a position of the first target object in a second captured image of the first target object acquired after outputting after a predetermined time interval the imaging command to the imaging device;

deriving, for a subsequent observation process, the amount of delay based on relationship between the acquired target position in the first captured image and the detected position of the first target object in the second captured image; and setting the derived amount of delay as the time interval between receiving the detection signal and outputting the imaging command in the subsequent observation process, wherein the amount of delay is derived from an amount of correction and a moving speed of the first target object, and the amount of correction is calculated by an inner product of a first vector indicative of a moving direction and moving distance of the first target object to the targeted position and a second vector indicative of moving direction and moving distance of the first target object conveyed on the conveying path in the imaging range.

7. An image processing method for processing a captured image of a target object under observation, the image processing method comprising:

capturing a plurality of images of the target object using an imaging device, the target object being conveyed on a conveying path;

sending a detection signal when the target object reaches an imaging range of the imaging device using a sensor;

receiving a detection signal from the sensor;

outputting an imaging command to the imaging device;

receiving operation data from an external source;

outputting an image to a display device;

setting an amount of delay for controlling output timing of the imaging command, the amount of delay being time interval between receiving the detection signal and outputting the imaging command in an observation process of the target object, acquiring a target position in a first captured image of a first target object based on the operation data;

outputting after a predetermined time interval the imaging command to the imaging device after receiving the detection signal;

detecting a position of the first target object in a second captured image of the first target object acquired after outputting after a predetermined time interval the imaging command to the imaging device;

deriving, for a subsequent observation process, the amount of delay based on relationship between the acquired target position in the first captured image and the detected position of the first target object in the second captured image; and setting the derived amount of delay as the time interval between receiving the detection signal and outputting the imaging command in the subsequent observation process, wherein the amount of delay is derived from an amount of correction and a moving speed of the first target object, and the amount of correction is calculated by an inner product of a first vector indicative of a moving direction and moving distance of the first target object to the targeted position and a second vector indicative of moving direction and moving distance of the first target object conveyed on the conveying path in the imaging range.

* * * * *